(12) United States Patent
Todoroki

(10) Patent No.: US 8,727,539 B2
(45) Date of Patent: May 20, 2014

(54) PROJECTOR AND METHOD OF CONTROLLING PROJECTOR

(75) Inventor: Akinari Todoroki, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 318 days.

(21) Appl. No.: 13/280,589

(22) Filed: Oct. 25, 2011

(65) Prior Publication Data

US 2012/0105813 A1 May 3, 2012

(30) Foreign Application Priority Data

Oct. 28, 2010 (JP) ................................ 2010-241848
Oct. 28, 2010 (JP) ................................ 2010-241849

(51) Int. Cl.
*G03B 21/14* (2006.01)
*G03B 27/28* (2006.01)
*H04N 3/23* (2006.01)

(52) U.S. Cl.
USPC ............... 353/69; 353/70; 382/274; 382/275; 348/746; 359/697

(58) Field of Classification Search
USPC ............... 353/69, 70; 382/274, 275; 348/745, 348/746; 359/697
See application file for complete search history.

(56) References Cited

U.S. PATENT DOCUMENTS

| 2003/0223048 | A1  | 12/2003 | Kimura |
| 2006/0170877 | A1* | 8/2006 | Kamiya et al. ................ 353/69 |
| 2006/0227298 | A1  | 10/2006 | Matsumoto et al. |
| 2010/0046088 | A1* | 2/2010 | Kubota ...................... 359/697 |

FOREIGN PATENT DOCUMENTS

| CN | 1845592 A | 10/2006 |
| JP | 2003-283963 A | 10/2003 |

* cited by examiner

*Primary Examiner* — Georgia Y Epps
*Assistant Examiner* — Magda Cruz
(74) *Attorney, Agent, or Firm* — ALG Intellectual Property, LLC

(57) ABSTRACT

In at least one embodiment of the disclosure, a projector comprises an imaging unit that photographs a projection surface and acquires a first photographed image during a projection of a featured image at a first time point and acquires a second photographed image during the projection of the featured image at a second time point different from the first time point. An image processing unit generates a reference image based on the first photographed image and generates a comparative image based on the second photographed image. A movement detecting unit detects a change in a relative position of the projector with respect to the projection surface by using the reference image and the comparative image generated by the image processing unit.

16 Claims, 13 Drawing Sheets

PROJECTOR AND METHOD OF CONTROLLING PROJECTOR

CROSS-REFERENCE

The present application claims priority from Japanese Patent Application Nos. 2010-241848 and 2010-241849 which were each filed on Oct. 28, 2010, and each of which is incorporated herein by reference in its entirety.

BACKGROUND

In a case where an image is projected onto a projection surface such as a screen by a projector, it is known that an image formed on the projection surface is distorted in accordance with a projection angle of the projector. A general projector has a trapezoidal distortion correction function for transforming a projected image into a correct shape on the projection surface. When the projector is moved after the trapezoidal distortion correction, the projection angle changes, whereby distortion occurs in the projection image again. Thus, a technique is proposed in which the trapezoidal distortion correction is performed again in a case where a projector having a function of detecting the installation angle detects a change in the installation angle (see, for example, JP-A-2003-283963). The projector disclosed in JP-A-2003-283963 has a function of detecting a tilt angle by using an acceleration sensor and automatically performs trapezoidal distortion correction in a case where the angle of the projector changes by three or more angles.

However, the distortion of the projection image is influenced by not only the tilt angle of the projector but also the projection angle in a horizontal plane. Accordingly, distortion may occur where the relative position of the projector with respect to the projection surface changes. Therefore, in order to respond to the distortion of the projection image that is currently projected, one may detect the movements of the projector in various directions or the movement of the projection surface side. However, according to a general method, it is difficult to detect all the movements.

SUMMARY

In accordance with certain embodiments of the disclosure, it is possible to provide a projector capable of reliably detecting a change in the relative position of the projector with respect to the projection surface such as a change in the projection angle and a method of controlling the projector.

An aspect of the disclosure is directed to a projector that projects an image onto a projection surface. The projector includes a projection unit that projects the image, a projection control unit that allows the projection unit to project the image that includes a featured image used for movement detection, an imaging unit that photographs the projection surface, an image processing unit that generates a reference image based on a first photographed image that is photographed so as to be acquired by the imaging unit during projection of the featured image that is performed by the projection unit and generates a comparative image based on a second photographed image that is photographed so as to be acquired by the imaging unit at a time point other than a time point, at which the first photographed image is photographed, during the projection of the featured image, and a movement detecting unit that detects a change in a relative position of the projector with respect to the projection surface by using the reference image and the comparative image that are generated by the image processing unit.

According to an aspect of the disclosure, by using the reference image that is based on a photographed image acquired by photographing the projection surface in the state in which an image including the featured image used for movement detection is projected onto the projection surface and the comparative image that is based on a photographed image photographed at a time point other than the time point, at which the above-described photographing is performed, in the state in which an image including the featured image is projected onto the projection surface, a change in the relative position of the projector with respect to the projection surface is detected. The photographing is performed in the state in which the image including the featured image is projected onto the projection surface, and the reference image and the comparative image that are based on the photographed images are compared with each other. Accordingly, the movement can be reliably detected by performing comparison without being influenced by the status of the projection surface or the like. Therefore, even in a case where any one of the projection surface and the projector is moved, the movement can be reliably detected regardless of the movement direction. For example, a change in the position of the projector that changes the projection angle can be detected. Accordingly, a process of automatically performing distortion correction of the image formed on the projection surface or the like can be performed, whereby the convenience can be improved.

According to an aspect of the disclosure, a difference between the reference image and the comparison image is reliably detected without being influenced by the status of the projection surface or the like, and the change in the relative position of projector with respect to the projection surface can be reliably detected.

In addition, according to an aspect of the disclosure, by using the featured image having a frame shape, the difference between the reference image and the comparative image can be detected more reliably.

In addition, according to an aspect of the disclosure, the featured image can be projected so as not to overlap the projection image, and the featured image can be projected without being restricted by the projection image that is currently projected, and a difference between the reference image and the comparative image can be detected more reliably.

In addition, according to an aspect of the disclosure, the featured image can be projected so as not overlap the projection image by using a non-display portion located in a displayable area of a display unit. Accordingly, the featured image can be projected without being restricted by the projection image that is currently projected, and the difference between the reference image and the comparative image can be detected more reliably.

In addition, according to an aspect of the disclosure, in a case where a change in the relative position of the projection surface and the projector is detected, trapezoidal distortion correction is performed for the projected image, whereby the image projected onto the projection surface can be maintained in a state in which distortion is relatively small.

Another aspect of the disclosure is directed to a method of controlling a projector that includes a projection unit that projects an image onto a projection surface. The method includes projecting the image that includes a featured image used for movement detection by using the projection unit and generating a reference image based on a first photographed image that is photographed so as to be acquired by an imaging unit during projection of the featured image; generating a comparative image based on a second photographed image that is photographed so as to be acquired by the imaging unit at a time point other than a time point, at which the first photographed image is photographed, during the projection of the featured image; and detecting a change in a relative position of the projector with respect to the projection surface by using the reference image and the comparative image that are generated.

In accordance with certain embodiments, by using the reference image that is based on a photographed image acquired by photographing the projection surface in the state in which an image including the featured image used for movement detection is projected onto the projection surface and the comparative image that is based on a photographed image photographed at a time point other than the time point, at which the above-described photographing is performed, in the state in which an image including the featured image is projected onto the projection surface, the projector detects a change in the relative position of the projector with respect to the projection surface. The photographing is performed in the state in which the image including the featured image is projected onto the projection surface, and the reference image and the comparative image that are based on the photographed images are compared with each other. Accordingly, the movement can be reliably detected by performing comparison without being influenced by the status of the projection surface or the like. Therefore, even in a case where any one of the projection surface and the projector is moved, the movement can be reliably detected regardless of the movement direction. For example, a change in the position of the projector that changes the projection angle can be detected. Accordingly, a process of automatically performing distortion correction of the image formed on the projection surface or the like can be performed, whereby the convenience can be improved.

In addition, according to an aspect of the disclosure, in a case where the projector detects a change in the relative position of the projection surface and the projector, trapezoidal distortion correction is performed, whereby the image projected onto the projection surface can be maintained in a state in which distortion is relatively small.

Still another aspect of the disclosure is directed to a projector that projects an image on a projection surface. The projector includes a projection unit that projects the image; an imaging unit that photographs the projection surface; an image processing unit that generates a reference image based on a first photographed image that is photographed so as to be acquired by the imaging unit and generates a comparative image based on a second photographed image that is photographed so as to be acquired by the imaging unit at a time point other than a time point, at which the first photographed image is photographed; and a movement detecting unit that detects a change in a relative position of the projector with respect to the projection surface by detecting a difference between images due to a change in the position of a featured object, which is in a photographing range of the imaging unit, inside the image by comparing the reference image and the comparative image that are generated by the image processing unit.

According to an aspect of the disclosure, a change in the relative position of the projector with respect to the projection surface is detected by detecting a difference between images that is caused by a positional change of the featured object, which is in the range of the photographing range, inside the image by comparing the reference image and the comparative image that are generated based on the photographed images acquired by photographing the projection surface. Accordingly, even in a case where any one of the projection surface and the projector is moved, the movement can be reliably detected regardless of the movement direction. For example, a change in the relative position of the projector with respect to the projection surface, which changes the projection angle, can be detected. Accordingly, a process of automatically performing distortion correction of the image formed on the projection surface or the like can be performed, whereby the convenience can be improved.

In addition, according to an aspect of the disclosure, a difference between the reference image and the comparison image can be reliably detected.

In addition, according to an aspect of the disclosure, by using the projector that projects an image on a screen, a difference between the reference image and the comparative image that are generated based on photographed images acquired by photographing the projection surface on which the screen is installed is detected in a relatively speedy manner, and the change in the relative position of the projector with respect to the screen can be reliably detected in a relatively speedy manner.

In addition, according to an aspect of the disclosure, a difference between the reference image and the comparative image can be detected without being influenced by the image that is currently projected on the screen by comparing the images in the range in which the inner side of the frame of the screen is excluded. Accordingly, even during a process of projecting an image onto the screen, a change in the relative position of the projector with respect to the screen can be reliably detected in a relatively speedy manner.

In addition, according to an aspect of the disclosure, a difference between the reference image and the comparative image can be detected without being influenced by the shadow of a person moving on the periphery of the screen, and accordingly, a change in the relative position of the projector with respect to the screen can be reliably detected in a relatively speedy manner.

In addition, according to an aspect of the disclosure, in a case where a change in the relative position of the projection surface and the projector is detected, trapezoidal distortion correction is performed for the projected image, whereby the image projected onto the projection surface can be maintained in a state in which distortion is relatively small.

Yet another aspect of the disclosure is directed to a method of controlling a projector that includes an imaging unit and projects an image onto a projection surface. The method includes generating a reference image based on a first photographed image that is acquired by allowing the imaging unit to photograph the projection surface; generating a comparative image based on a second photographed image that is photographed so as to be acquired by the imaging unit at a time point other than a time point, at which the first photographed image is photographed; and detecting a change in a relative position of the projector with respect to the projection surface by detecting an image difference caused by a change in the position of a featured object, which is in a photographing range of the imaging unit, inside the images by comparing the reference image and the comparative image.

By performing the above-described control method, the projector detects a difference between images, which is caused by a change in the position of the featured object disposed in the photographing range inside the image, by comparing the reference image generated based on a photographed image acquired by photographing the projection surface and the comparative image generated based on a photographed image acquired by photographing the projection surface at another time point with each other, thereby detecting the change in the relative position of the projector with respect to the projection surface. Therefore, even in a case where any one of the projection surface and the projector is moved, the movement can be reliably detected regardless of the movement direction. For example, a change in the relative position of the projector with respect to the projection surface, which changes the projection angle, can be reliably detected. Accordingly, a process of automatically performing distortion correction of the image formed on the projection surface or the like can be performed, whereby the convenience can be improved.

In addition, according to an aspect of the disclosure, in a case where the projector detects a change in the relative position of the projection surface and the projector, trapezoidal distortion correction is performed, whereby the image projected onto the projection surface can be maintained in a state in which distortion is relatively small.

According to certain aspects of the disclosure, even in a case where any one of the projection surface and the projector is moved, the movement can be reliably detected regardless of the movement direction without being influenced by the status of the projection surface or the like.

BRIEF DESCRIPTION OF THE DRAWINGS

Non-limiting and non-exhaustive embodiments of the present disclosure will be described with reference to the accompanying drawings, wherein like numbers reference like elements.

FIG. 4A shows an example of a projection image before correction, FIG. 4B shows a displayable area of a liquid crystal panel before correction, FIG. 4C shows an example of the projection image after correction, and FIG. 4D shows the displayable area of the liquid crystal panel after correction.

FIG. 7A shows an example of a projection image, FIG. 7B shows an example of the measurement pattern, and FIG. 7C shows an example in which the measurement pattern is projected so as to overlap the image.

FIG. 8A shows an example of a measurement pattern having a frame shape, and FIG. 8B shows an example in which the measurement pattern having the frame shape is projected so as to overlap the image.

FIG. 13A shows an example of the reference image, and FIG. 13B shows an example of the mask image.

DESCRIPTION OF EXEMPLARY EMBODIMENTS

Hereinafter, embodiments of the disclosure will be described with reference to the accompanying drawings. It is to be understood, however, that other embodiments may be utilized and changes may be made without departing from the scope of the present disclosure. Therefore, the following detailed description is not to be taken in a limiting sense, and the scope of the present disclosure is defined by the appended claims and their equivalents.

Throughout the specification and claims, the following terms take at least the meanings explicitly associated herein, unless the context clearly dictates otherwise. The meanings identified below are not intended to limit the terms, but merely provide illustrative examples for use of the terms. The meaning of "a," "an," "one," and "the" may include reference to both the singular and the plural. Reference in the specification to "one embodiment" or "an embodiment" means that a particular feature, structure, or characteristic described in connection with the embodiment may be included in at least one embodiment of the disclosure. The appearances of the phrases "in one embodiment" or "in an embodiment" in various places in the specification do not necessarily all refer to the same embodiment, but it may.

Several embodiments will sequentially be described under corresponding section headings below. Section headings are merely employed to improve readability, and they are not to be construed to restrict or narrow the present disclosure. For example, the order of description headings should not necessarily be construed so as to imply that these operations are necessarily order dependent or to imply the relative importance of an embodiment. Moreover, the scope of a disclosure under one section heading should not be construed to restrict or to limit the disclosure to that particular embodiment, rather the disclosure should indicate that a particular feature, structure, or characteristic described in connection with a section heading is included in at least one embodiment of the disclosure, but it may also be used in connection with other embodiments.

First Embodiment

Hereinafter, an embodiment of the disclosure will be described with reference to the accompanying drawings.

Figure 1:
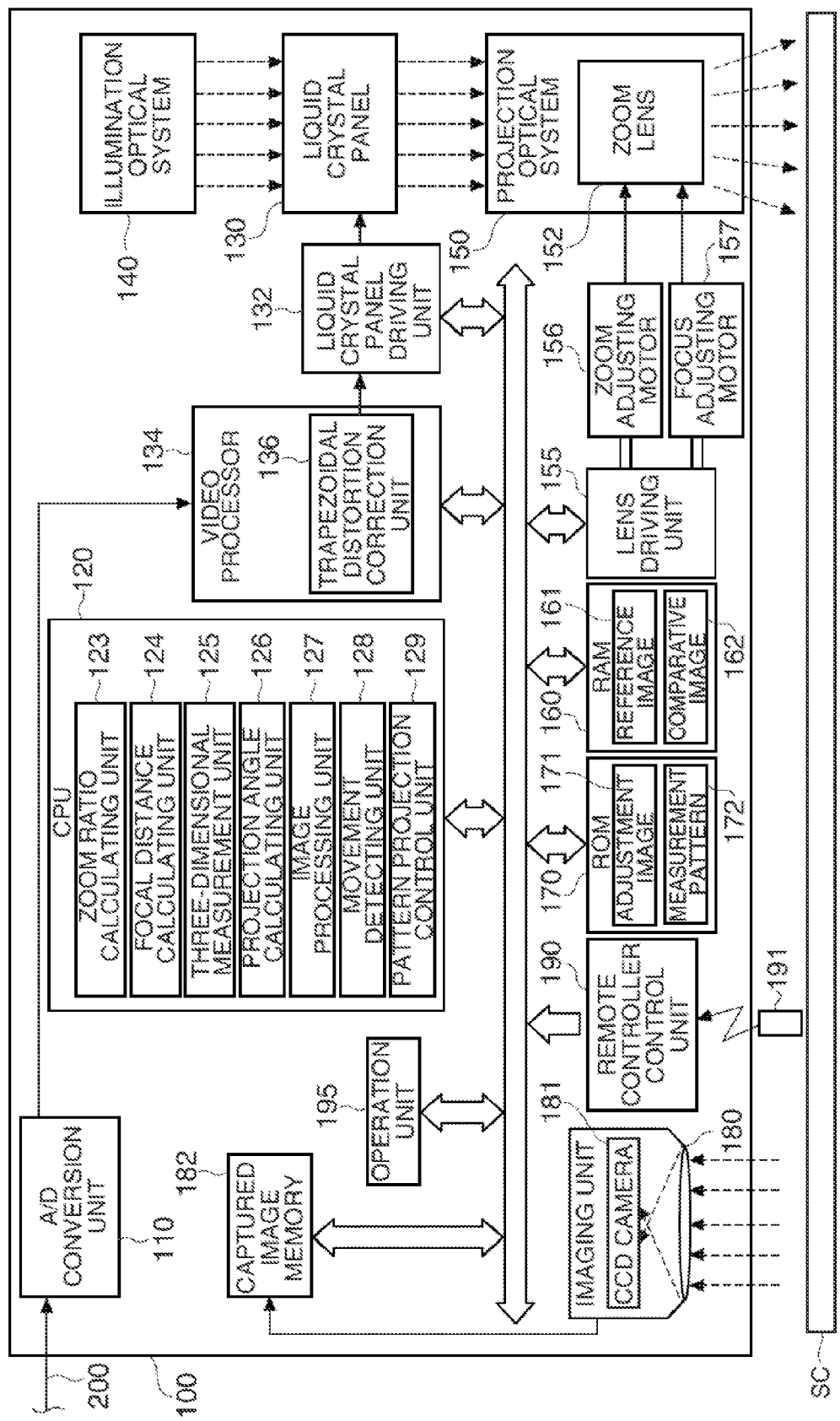
FIG. 1 is a block diagram showing the configuration of a projector according to a first embodiment of the disclosure.

FIG. 1 is a block diagram showing the entire configuration of a projector 100 according to a first embodiment of the disclosure. An image signal is input to the projector 100 from a video source (not shown in the figure) that is stored in a built-in storage device or an external image supplying device (not shown in the figure) such as a personal computer or various video players. The projector 100 projects light modulated based on an input image signal onto a projection surface such as a screen SC, and thereby displaying an image (hereinafter, referred to as a "projection image"). In this embodiment, the screen SC is substantially erected, and the screen surface has a rectangular shape. The image input to the projector 100 may be either a moving image (video) or a still image. The projector 100 can project the video onto the screen SC or continuously project a still image onto the screen SC. In the embodiment described below, a case will be described as an example in which a video is projected based on a video signal that is input from the outside.

The projector 100 is basically configured by an optical system that forms an optical image and an image processing system that electrically processes a video signal. The optical system serving as a projection unit is configured by an illumination optical system 140, a liquid crystal panel 130, and a projection optical system 150. The illumination optical system 140 includes a light source that is configured by a xenon lamp, an ultrahigh pressure mercury lamp, an LED, or the like. The illumination optical system 140 may include a reflection mirror and an auxiliary reflection mirror that guide light emitted by the light source to the liquid crystal panel 130. Alternatively, the illumination optical system 140 may include a lens group (not shown) used for improving the optical characteristics of the projection light, a polarizing plate, a dimming device that reduces light on a path through which light emitted by the light source reaches the liquid crystal panel 130, and the like.

The liquid crystal panel 130 (display unit) receives a signal from the image processing system to be described later and forms an image on a panel face. In order to perform color projection, the liquid crystal panel 130 is configured by including three liquid crystal panels corresponding to three primary colors RGB. Accordingly, light transmitted from the illumination optical system 140 is separated into color beams of three colors RGB, and light of each color is incident to a corresponding liquid crystal panel. The color beams that are modulated by passing the liquid crystal panels are composed by a composition optical system such as a cross-dichroic prism, and the composed light is projected to the projection optical system 150.

In the projection optical system. 150, a zoom lens 152 that scales an image to be projected and adjusts focus, a zoom adjusting motor 156 that adjusts the degree of zoom, and a focus adjusting motor 157 that adjusts focus are included. The projection optical system 150 receives light modulated by the liquid crystal panel 130 and forms a projection image on a screen SC by using the zoom lens 152. By adjusting the position of the lens and the like using the zoom adjusting motor 156 and the focus adjusting motor 157, the zoom lens 152 performs zoom adjusting in which a projection image formed on the screen SC is scaled and focus adjusting in which a projection image is appropriately imaged on the screen SC.

The image processing system is mainly configured by a CPU 120 that integrally controls the entire projector 100 and a video processor 134 and includes: an A/D conversion unit 110; a liquid crystal panel driving unit 132; a lens driving unit 155; a RAM 160; a ROM 170 that includes a distortion adjustment image storing unit 171 and a measurement pattern storing unit 172; an imaging unit 180 that includes a CCD camera 181; a captured image memory 182; a remote controller control unit 190; a remote controller 191; an operation unit 195; and the like. The elements configuring the image processing system are interconnected through a bus 102.

The A/D conversion unit 110 is a device that performs A/D conversion for an analog input signal input from the above-described external image supplying device through a cable 200 and outputs a converted digital signal to the video processor 134. The video processor 134 performs a process of adjusting the display statuses of an image such as the luminance, the contrast, the color density, the color shade, and the shape of a projection image for the digital signal input from the A/D conversion unit 110 and then outputs a video signal after the process to the liquid crystal panel driving unit 132. The liquid crystal panel driving unit 132 drives the liquid crystal panel 130 based on a video signal input from the video processor 134. Accordingly, a video corresponding to the video signal input to the A/D conversion unit 110 is formed on the liquid crystal panel 130, and this image is formed as a projection image on the screen SC through the projection optical system 150.

As image processing performed by the video processor 134, other than correction of the brightness, the contrast, the color shade, or the like described above, a trapezoidal distortion correction is included. In FIG. 1, a circuit that performs the trapezoidal distortion correction is illustrated as a trapezoidal distortion correction unit 136. The trapezoidal distortion correction unit 136 performs the trapezoidal distortion correction for the digital signal based on values of a projection distance and a projection angle of projection that are calculated by a processing unit included in the CPU 120.

In addition, the video processor 134 controls the display of a specific distortion detection image in the trapezoidal distortion correction. The video processor 134 may be configured by using a general-purpose processor that is sold as a trapezoidal distortion correction DSP (digital signal processor) or may be configured by a dedicated ASIC.

Furthermore, in a case where a measurement pattern to be described later is input from the CPU 120 together with a command, the video processor 134 overlaps the image of the measurement pattern with the image input from the A/D conversion unit 110 so as to be displayed by the liquid crystal panel driving unit 132. The video processor 134 may stop the display of the image input from the A/D conversion unit 110 and display only the measurement pattern under the control of the CPU 120.

The CPU 120 performs image processing in the projector 100 together with the video processor 134. The CPU 120 includes a zoom ratio calculating unit 123, a focal distance calculating unit 124, a three-dimensional measurement unit 125, a projection angle calculating unit 126, an image processing unit 127, a movement detecting unit 128, and a pattern projection control unit 129 (projection control unit). Each unit described above is realized by executing a specific program stored in the ROM 170 in advance by using the CPU 120.

Each processing unit described above such as the zoom ratio calculating unit 123, the focal distance calculating unit 124, the three-dimensional measurement unit 125 or the projection angle calculating unit 126 performs a process necessary for calculating a relative distance (hereinafter, referred to as a projection distance) between the projector 100 and the screen SC or a projection angle (hereinafter, referred to as projection angle of projection) that is an inclination of the screen SC with respect to the optical axis of projection light projected from the projector 100.

When the projection angle of projection and the projection distance are calculated based on the function of each processing unit described above, the CPU 120 outputs a signal corresponding to the projection angle of projection to the video processor 134 and outputs a signal corresponding to the projection distance to the lens driving unit 155. When the signal corresponding to the projection angle of projection is input from the CPU 120, the video processor 134 performs the trapezoidal distortion correction based on the signal. When the projection angle of projection that is an angle formed by the optical axis of the optical system of the projector 100 and the screen SC is specified, how the video distorts can be recognized. When a parameter corresponding to the projection angle of projection is set, the video processor 134, in order to correct the distortion of the projection image, corrects the image input from the A/D conversion unit 110 and outputs a video signal after correction to the liquid crystal panel driving unit 132. Based on the function of the trapezoidal distortion correction unit 136, the image displayed on the liquid crystal panel 130 is transformed so as to correct the trapezoidal distortion.

In addition, the image processing unit 127 and the pattern projection control unit 129 that are included in the CPU 120, as described later, generates a reference image and a comparative image that are used for detecting a change in the relative position between the screen SC and the projector 100, and the movement detecting unit 128 detects a change in the relative position of the projector 100 with respect to the screen SC based on the reference image and the comparative image that have been generated.

The image processing unit 127 acquires a photographed image that is photographed by the imaging unit 180 and is stored in the captured image memory 182 and performs processes such as a Y-component extracting process, a contour enhancing process, a noise eliminating process, and a vertex calculating process for the photographed image, thereby generating the reference image. In addition, the image processing unit 127 acquires a photographed image that is photographed by the imaging unit 180 and is stored in the captured image memory 182 and, similarly to the case of the reference image, performs processes such as the Y-component extracting process, the contour enhancing process, the noise eliminating process, and the vertex calculating process for the photographed image, thereby generating the comparative image. The photographed image that is the origin of the reference image and the photographed image that is the origin of the comparative image are photographed images that are photographed at different times. The image processing unit 127 generates the comparative image by acquiring a photographed image at a predetermined period. The reference image generated by the image processing unit 127 is stored in a reference image storing unit 161 that is included in the RAM 160. In addition, the comparative image generated by the image processing unit 127 is stored in a comparative image storing unit 162 that is included in the RAM 160.

In addition, there is also a case where the screen SC is photographed by the imaging unit 180 in a state in which the measurement pattern is projected onto the screen SC, and the reference image and the comparative image are generated based on the photographed image. In such a case, an image of the measurement pattern is included in the reference image and the comparative image. For example, in a case where a featured object is not included in the photographed image of the imaging unit 180 such as a case where a white wall face is used as the screen SC, it is difficult to compare the reference image and the comparative image with each other. In such a case, by projecting the measurement pattern onto the screen SC, the reference image and the comparative image can be accurately compared with each other by using the image of the measurement pattern.

More specifically, by using the function of the pattern projection control unit 129 included in the CPU 120, the measurement pattern (a featured image) stored in the measurement pattern storing unit 172 is read out and is output to the video processor 134 together with a command. The video processor 134 overlaps the input measurement pattern with the projection image in accordance with the input command and allows the liquid crystal panel driving unit 132 to display a resultant image. As above, the imaging unit 180 performs photographing in a state in which the measurement pattern is projected onto the screen SC. The projection of the measurement pattern is performed either at the time of photographing for generating the reference image or at the time of photographing for generating the comparative image.

The movement detecting unit 128, as described later, detects a change in the relative position of the projector 100 with respect to the screen SC by comparing the reference image and the comparative image that are generated by the image processing unit 127.

When a signal corresponding to the projection distance is input from the CPU 120, the lens driving unit 155 performs the focus adjusting by driving the focus adjusting motor 157 based on the signal. In order to perform focus adjusting, the zoom ratio of the zoom lens 152 is necessary. This zoom ratio, for example, may be calculated by the amount of driving of the zoom lens 152 that is performed by the zoom adjusting motor 156 or may be calculated based on a photographed image photographed by the imaging unit 180.

The RAM 160 forms a work area in which a program executed by the CPU 120 or data is temporarily stored. In addition, the video processor 134 includes a work area that is necessary for performing each process such as an adjustment process of the display status of an image that is performed by the video processor 134 as an internal RAM. The RAM 160 includes the reference image storing unit 161 that stores the reference image generated by the image processing unit 127 therein and the comparative image storing unit 162 that stores the comparative image generated by the image processing unit 127 therein.

In addition, the ROM 170 stores a program executed by the CPU 120 for realizing each processing unit described above, data relating to the program, and the like. Furthermore, the ROM 170 stores data of an adjustment image, which is projected onto the screen SC in the trapezoidal distortion correction process to be described later, in the adjustment image storing unit 171.

The remote controller control unit 190 receives a wireless signal that is transmitted from the external remote controller 191 of the projector 100. The remote controller 191 includes operation parts (not shown) operated by a user and transmits an operation signal corresponding to the operation of the operation parts as an infrared signal or a wireless signal using an electric wave of a predetermined frequency. The remote controller control unit 190 includes a reception section (not shown) that receives an infrared signal or a reception circuit (not shown) that receives a wireless signal, receives and analyzes a signal transmitted from the remote controller 191, generates a signal representing the content of the user's operation, and outputs the signal to the CPU 120.

The operation unit 195 includes operation parts (not shown) and outputs an operation signal corresponding to an operation of the operation parts to the CPU 120. As the operation parts, there are a switch that is used for instructing power On/Off, a switch that is used for instructing the start of a trapezoidal distortion correction, a switch that is used for instructing the start of a re-correction process to be described later, and the like.

The imaging unit 180 includes the CCD camera 181 that uses a CCD as a known image sensor. The imaging unit 180 is disposed at a position at which the front face of the projector 100, that is, a direction in which the projection optical system 150 projects a video toward the screen SC can be imaged by the CCD camera 181. In the imaging unit 180, the camera direction and the image angle of the CCD camera 181 are set such that the entire projection image projected on the screen SC at a recommended projection distance at least fits into the imaging range. The CCD camera 181 includes, in addition to the CCD, a fixed focal length lens that forms an image on the CCD, a mechanism such as an automatic iris that adjusts the amount of light incident to the CCD, and a control circuit that reads out an image signal from the CCD, and the like. The automatic iris mechanism receives a signal corresponding to a value of accumulated brightness of an image transmitted from the CCD camera 181 from the control circuit and automatically adjusts an iris (aperture) disposed in the fixed focal length lens such that the value of accumulated brightness fits into a predetermined range.

An image of which the brightness is adjusted by the automatic iris is output from the imaging unit 180 to the captured image memory 182 and is repeatedly written into a predetermined area of the captured image memory 182. When writing of an image corresponding to one screen is completed, the captured image memory 182 sequentially inverts a flag stored in a predetermined area. Accordingly, the CPU 120 can check whether or not imaging using the imaging unit 180 has completed by referring to the flag. The CPU 120 accesses the captured image memory 182 while referring to the flag, and thereby acquiring a needed photographed image.

Subsequently, the operation of the projector 100 will be described.

Figure 2:
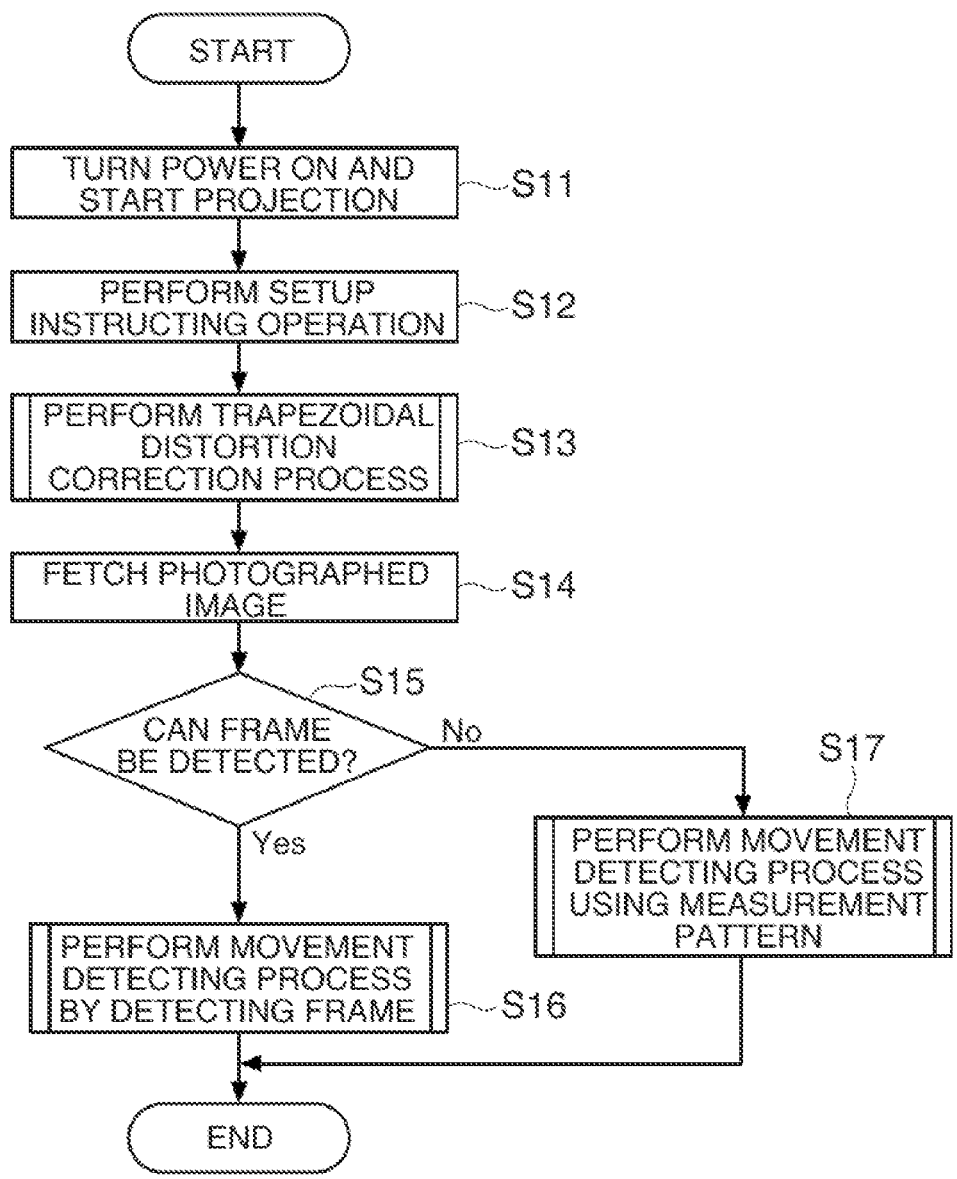
FIG. 2 is a flowchart showing the operation of the projector.
Figure 3:
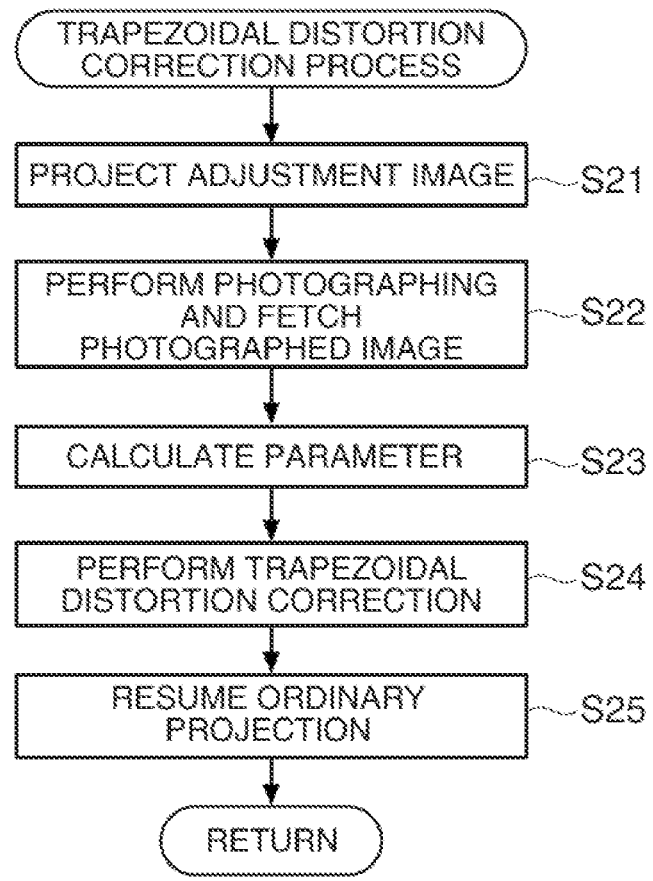
FIG. 3 is a flowchart showing a trapezoidal distortion correction process of the projector.

FIGS. 2 and 3 are flowcharts illustrating the operations of the projector 100. FIG. 2 illustrates the overall operation, and FIG. 3 illustrates the trapezoidal distortion correction process illustrated in Step S13 shown in FIG. 2.

When power is turned on, the projector 100 starts to project a projection image based on a video signal that is input from the outside (Step S11). When the projector 100 is instructed to execute a setup in accordance with an operator's operation for the remote controller 191 or the operation unit 195 (Step S12), the projector performs the trapezoidal distortion correction process (Step S13). Through this trapezoidal distortion correction process, the deformation of the projection image, which is projected onto the screen SC, that is caused by the projection angle of projection of the projector 100 is corrected, and the projection image is in the approximately original shape.

Here, the trapezoidal distortion correction process will be described.

As shown in FIG. 3, the CPU 120 of the projector 100 stops the display of the video signal input from the A/D conversion unit 110 to the video processor 134 by controlling the video processor 134. In addition, the CPU 120 reads out the adjustment image stored in the adjustment image storing unit 171 and outputs the adjustment image to the video processor 134 together with a command, thereby displaying the adjustment image on the liquid crystal panel 130 so as to be projected onto the screen SC (Step S21).

Next, the CPU 120 allows the projection image to be photographed by the imaging unit 180 in the state in which the adjustment image is projected onto the screen SC (Step S22). This photographed image is stored in the captured image memory 182 under the control of the CPU 120.

The CPU 120 acquires the photographed image photographed during the process of projecting the adjustment image from the captured image memory 182 and calculates a parameter used for correcting the trapezoidal distortion based on the photographed image by using the trapezoidal distortion correction unit 136 (Step S23).

In Step S23, the CPU 120 performs a three-dimensional measurement process by using the function of the three-dimensional measurement unit 125. This three-dimensional measurement process is a process of detecting the three-dimensional status of a plane including the screen SC in a three-dimensional coordinate system (hereinafter, also referred to as a "lens coordinate system") in which the principal point of the zoom lens 152 of the projector 100 is set as the origin. In other words, a three-dimensional inclination of the screen SC with respect to the optical axis of the projection optical system 150 of the projector 100 is detected. In this process, the photographed image acquired from the captured image memory 182 is discretized, and the centers of 16 quadrangles included in the photographed image are acquired as measurement points. Subsequently, the CPU 120 selects three points, which can define a plane, from among the measurement points and detects three-dimensional coordinates of the selected three measurement points in the lens coordinate system. The CPU 120 calculates an approximate plane that approximates the plane including the screen SC based on the three-dimensional coordinates of the three measurement points that have been detected. Subsequently, the CPU 120 calculates a projection angle of projection that is an angle formed by the approximate plane of the detected screen plane detected in the three-dimensional measurement process and the optical axis of projection light projected from the projector 100 by using the function of the projection angle calculating unit 126. Thereafter, the CPU 120 acquires the shape of an image after correction in the displayable area 131 of the liquid crystal panel 130 based on the calculated projection angle of projection. Then, the CPU 120 calculates a transformation coefficient (parameter) that is used for transforming the shape of an image before correction in the displayable area 131 of the liquid crystal panel 130 into the shape of an image after correction.

The CPU 120 sets the acquired parameter in the trapezoidal distortion correction unit 136 and allows the trapezoidal distortion correction unit 136 to perform trapezoidal distortion correction (Step S24). The trapezoidal distortion correction unit 136 transforms an input digital signal by using the set parameter and outputs the transformation result to the liquid crystal panel driving unit 132. In other words, the trapezoidal distortion correction unit 136 transforms an image displayed on the liquid crystal panel 130 so as to correct the trapezoidal distortion by repeating vector calculation for the coordinates of each pixel for the digital signal input from the A/D conversion unit 110. During the trapezoidal distortion correction process, in the displayable range of the liquid crystal panel 130 that is commonly in a rectangular shape, a video that is transformed into an approximate trapezoid defined by the parameter is displayed so as to correct the deformation of the projection image on the screen SC.

After the trapezoid distortion correction process is started, the CPU 120 allows the video processor 134 to resume projection of a video (Step S25) and ends the trapezoidal distortion correction process.

Figure 4A:
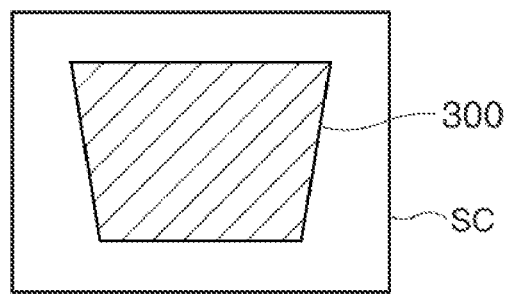
FIGS. 4A, 4B, 4C, and 4D are diagrams showing changes in the display status according to trapezoidal distortion correction.
Figure 4B:
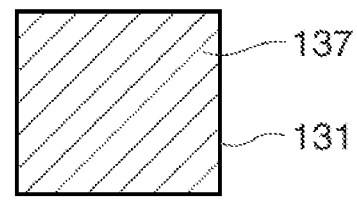
Figure 4C:
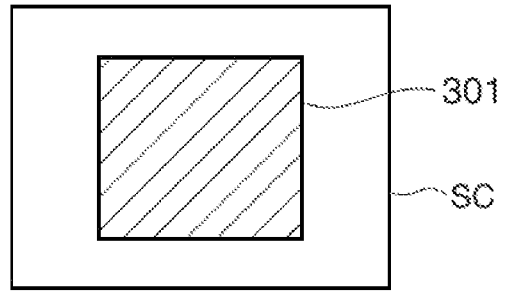
Figure 4D:
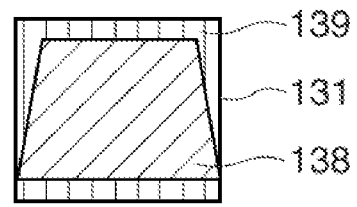

FIGS. 4A to 4D are diagrams showing changes in the display status according to the trapezoidal distortion correction. FIG. 4A shows an example of a projection image before correction on the screen SC, FIG. 4B shows a displayable area of the liquid crystal panel 130 before correction, FIG. 4C shows an example of the projection image after correction on the screen SC, and FIG. 4D shows the displayable area of the liquid crystal panel 130 after correction.

FIG. 4A shows an example in which distortion of the projection image on the screen SC occurs in accordance with the projection angle of projection of the projector 100. This example is a typical example in which the projector 100 is installed to the front side of the screen SC and projects a projection image upwardly, and the projection image 300 to be displayed as a rectangle is formed as an approximate trapezoid due to distortion. In the state shown in FIG. 4A, as shown in FIG. 4B, an image 137 is displayed on the entire face of the rectangular displayable area 131 of the liquid crystal panel 130.

When the parameter for correcting distortion is calculated by the process described with reference to FIG. 3, and the trapezoidal distortion correction is performed based on the parameter, as shown in FIG. 4C, a rectangular projection image 301 is projected onto the screen SC. In such a case, on the liquid crystal panel 130, as shown in FIG. 4D, a transformed image 138 after distortion correction is displayed in the displayable area 131 so as to correct the trapezoidal shape. In order to display the image 138 after distortion correction that has a trapezoidal shape in the displayable area 131 having a rectangular shape, the image 138 after distortion correction is displayed smaller than that in the state shown in FIG. 4B, and a non-use area 139 that is not used for a display is generated on the periphery of the image 138 after distortion correction. The pixels located in the non-use area 139 are displayed in black. Since the image 138 after distortion correction is smaller than the image 137 (FIG. 4B), the zoom ratio may be increased by driving the zoom lens 152 (FIG. 1) using the zoom adjusting motor 156 (FIG. 1) such that the image 138 after distortion correction is enlarged when the trapezoidal distortion correction is performed.

After the trapezoidal distortion correction process illustrated in FIG. 3 is performed, the CPU 120 allows the imaging unit 180 to perform photographing, as illustrated in FIG. 2, and thereby acquiring a photographed image from the captured image memory 182 (Step S14). The CPU 120 determines whether or not the frame of the screen SC is detected from the acquired photographed image (Step S15).

In a movement detecting process to be described later, photographing is performed by the imaging unit 180 at a predetermined time interval, and compares a reference image generated from the photographed image with a comparative image, thereby detecting the movement of the projector 100. When the reference image and the comparative image are compared with each other, the comparison can be easily performed in a case where an image of a feature common to both the reference image and the comparative image is included. As a specific example, there is the frame of the screen SC. Thus, in Step S15, it is determined whether or not frame of the screen SC is included the in photographed image as a feature that can be used for comparing the images. In a case where the screen SC having a black frame is used or a case where a white board is used as the screen SC, the frame of the screen SC is included in the photographed image of the imaging unit 180 in a visually recognizable manner. However, in a case where a wall face is used as the screen SC or the like, the frame of the screen SC is not included in the photographed image.

In a case where it is determined that the image of the frame of the screen SC can be detected from the photographed image (Yes in Step S15), the CPU 120 performs the movement detecting process that is based on the detection of the frame (Step S16). On the other hand, in a case where it is determined that the image of the frame of the screen SC cannot be detected from the photographed image (No in Step S15), the CPU 120 performs the movement detecting process using a measurement pattern (Step S17).

The movement detecting process illustrated in Steps S16 and S17 is a process of detecting a change in the relative position of the projector 100 with respect to the screen SC in a case where the relative position changes. In a case where the positional relation changes in accordance with the movement of the projector 100 or the screen SC, the projection angle of projection acquired in the trapezoidal distortion correction process of Step S13 changes, and accordingly, the parameter for the trapezoidal distortion correction changes. Therefore, the correction of distortion of the projection image projected onto the screen SC is insufficient. Thus, in order to maintain a state in which the distortion of the projection image is properly corrected, in a case where the relative position of the projector 100 with respect to the screen SC changes, the CPU 120 performs the movement detecting process of detecting the change and performs trapezoidal distortion correction every time a positional change of a predetermined amount or more is detected.

Figure 5:
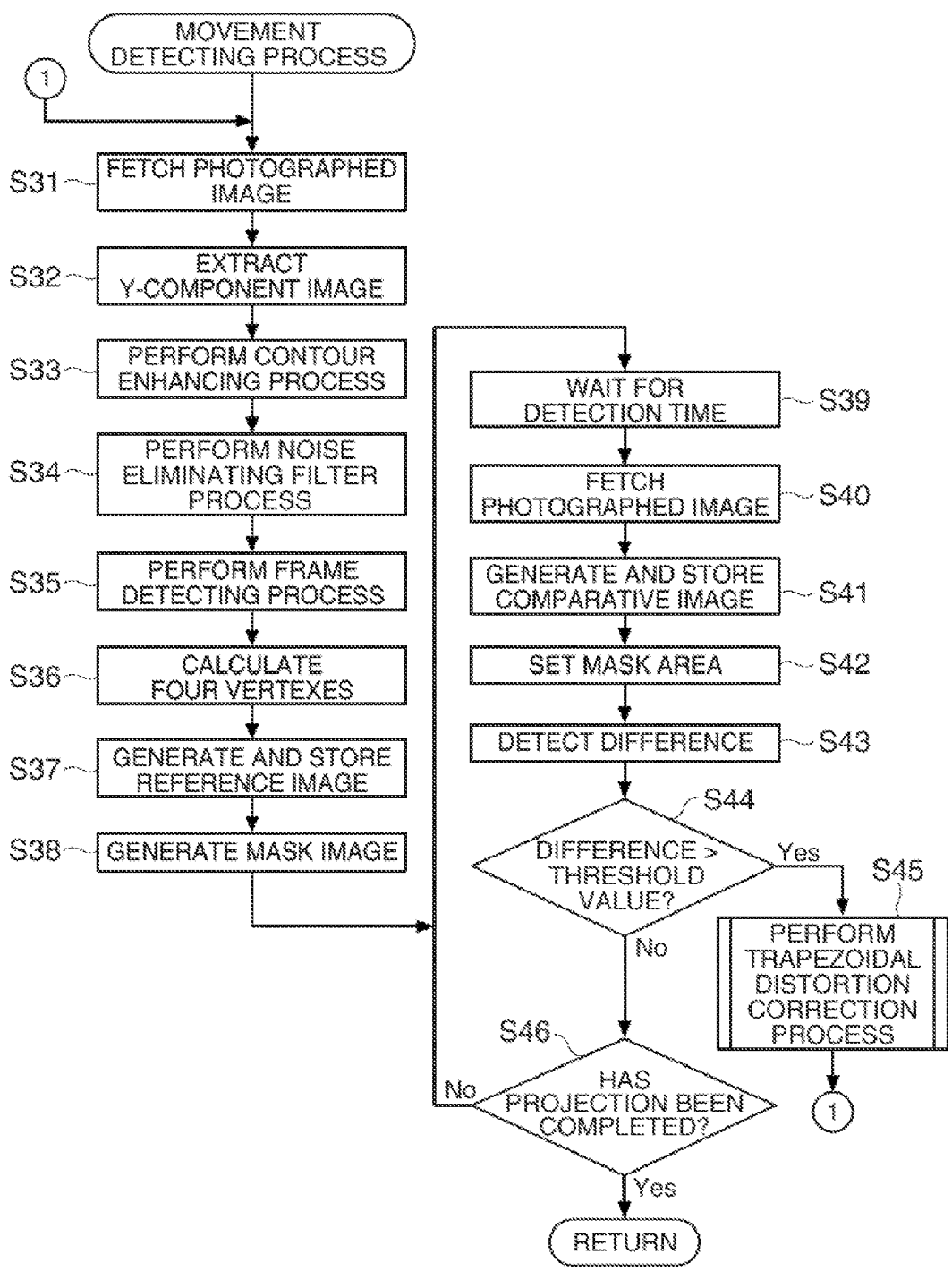
FIG. 5 is a flowchart illustrating a movement detecting process that is based on frame detection.

FIG. 5 is a flowchart illustrating the movement detecting process that is based on frame detection.

The CPU 120, first, acquires a photographed image (first photographed image) from the captured image memory 182 by allowing the imaging unit 180 to perform photographing (Step S31). Subsequently, the CPU 120 performs image processing such that the frame of the screen SC is enhanced in the photographed image by using the function of the image processing unit 127. In other words, the CPU 120 acquires a gray scale image, which is acquired by extracting only the luminance component (Y), by extracting an image of the Y component from the acquired photographed image (Step S32). Subsequently, the CPU 120 performs a contour enhancing process (Step S33) and a process using a noise eliminating filter (Step S34) for the gray scale image extracted from the photographed image. Through such processes, a monochrome binary image or a gray scale image in which the contour of the photographed image is enhanced is acquired. In a case where the frame of the screen SC is included in the photographed image, through the above-described image processing, the frame of the screen SC is enhanced as a quadrangle frame border image.

Next, the CPU 120 detects an image of the frame of the screen SC from the image acquired by the process of Steps S32 to S34 (Step S35) and performs a process of acquiring the positions of four angles (vertex points) of the detected frame (Step S36).

In addition, the CPU 120 sets the image acquired by the process of Steps S32 to S34 as a reference image and stores the acquired image in the reference image storing unit 161 (FIG. 1) (Step S37).

Thereafter, the CPU 120 generates a mask image used for masking the inner side of the frame detected in Step S35 and an area disposed away from the frame by a predetermined distance in the reference image stored in Step S36, by using the function of the image processing unit 127 and stores the mask image in the reference image storing unit 161 (Step S38).

The mask image is an image acquired by masking a portion of the reference image, and the masked portion is not a target to be compared with the comparative image. Instead of comparing the reference image and the comparative image with each other, by comparing the mark image acquired by masking a portion of the reference image with the comparative image, there are advantages that the processing load at the time of detecting the movement is reduced, and the movement can be accurately detected.

Here, the CPU 120 waits for a detection time that is set in advance (Step S39). This detection time affects the frequency of detecting a change in the relative position of the projector 100 with respect to the screen SC. Accordingly, by shortening the detection time, the change in the relative position can be checked more acutely. On the other hand, by lengthening the detection time, the load of the calculation process that is necessary for detection can be reduced. For example, the detection time may be about 1 second or 0.5 seconds or may be about several seconds or 0.1 second or less.

After the waiting for the detection time, the CPU 120 allows the imaging unit 180 to perform photographing and acquires a photographed image from the captured image memory 182 (Step S40). Subsequently, the CPU 120 generates a comparative image by allowing the image processing unit 127 to perform the same image processing as that performed in Steps S32 to S34 for the acquired photographed image (second photographed image) by using the function of the image processing unit 127 and stores the comparative image in the comparative image storing unit 162 (Step S41). The second photographed image is an image that is photographed at a time point different from the time point when the first photographed image is photographed. Here, if the relative position of the projector 100 with respect to the screen SC has not changed, the generated comparative image is the same image as the reference image that is generated in Step S37.

The CPU 120 sets a mask area in the comparative image stored in the comparative image storing unit 162 by using the function of the image processing unit 127 (Step S42). Here, the mask area that is set here is located at the same position as that of the masked area of the mask image generated in Step S38.

Then, the CPU 120 detects a difference between the reference image (mask image) stored in the reference image storing unit 161 and the comparative image in which the mask area is set in Step S42 by using the function of the movement detecting unit 128 (Step S43). In Step S43, for example, a sum of the absolute values of differences or a sum of squares of the differences is calculated based on the pixel data of each pixel of a portion of the two images compared with each other that is acquired by excluding the masked area.

Here, the CPU 120 determines whether or not the acquired difference exceeds a threshold value by using the function of the movement detecting unit 128 (Step S44). In a case where the difference exceeds the threshold value, it represents that the relative position of the projector 100 with respect to the screen SC changes, and accordingly, the CPU 120 performs trapezoidal distortion correction that is similar to the process shown in FIG. 3 (Step S45). After performing the trapezoidal distortion correction, the CPU 120 returns the process to Step S31 and generates a reference image again. In addition, since the reference image generated in Step S37 and the comparative image generated in Step S41 are the same images, after the trapezoidal distortion correction process of Step S45 is performed, the comparative image stored in the comparative image storing unit 162 may be stored in the reference image storing unit 161 as the reference image. In such a case, there is an advantage that the process of Steps S31 to S36 can be omitted.

On the other hand, in a case where the difference acquired in Step S43 does not exceed the threshold value (No in Step S44), the CPU 120 determines whether or not projection is completed (Step S46), and, in a case where the projection is not completed, the process is returned to Step S39. In Step S39, the detection time is waited, and the process of Steps S40 to S44 is performed again. In other words, the photographed image is fetched, a comparative image is generated, and the comparative image and the reference image are compared with each other. At this time, the mask image compared with the comparative image is a mask image that is stored in the reference image storing unit 161. In other words, until the difference exceeds the threshold value in Step S44, the reference image generated in Step S37 is continuously used. Then, until the difference between the reference image and the comparative image generated in Step S41 exceeds the threshold value, the process of Steps S40 to S44 is repeatedly performed for every detection time.

Through the movement detecting process shown in FIG. 5, the projector 100 performs trapezoidal distortion correction process in accordance with the operation of the remote controller 191 or the operation unit 195 after starting projection. Then, in a case where the relative position of the projector 100 with respect to the screen SC changes, and there is a change in the photographed image that is photographed by the imaging unit 180 in accordance with the change in the relative position, the projector 100 performs the trapezoidal distortion correction process again. Accordingly, in a case where re-correction is necessary after the distortion of the projection image is corrected, the status of the projection image can be maintained well by correcting the projection image in a relatively speedy manner.

In addition, in a case where the process of Steps S43 and S44 is performed by using the function of the movement detecting unit 128, the reference image (mask image) that is based on a photographed image photographed immediately after the trapezoidal distortion correction process performed in Step S13 (FIG. 2) or Step S45 and the comparative image for which mask processing is performed in Step S42 are compared with each other. Thus, since the CPU 120 detects a change in the relative position after the last (latest) trapezoidal distortion correction process, it can be accurately determined whether or not correction of the distortion of the projection image is necessary in accordance with the change in the relative position of the projector 100 and the screen SC.

Figure 6:
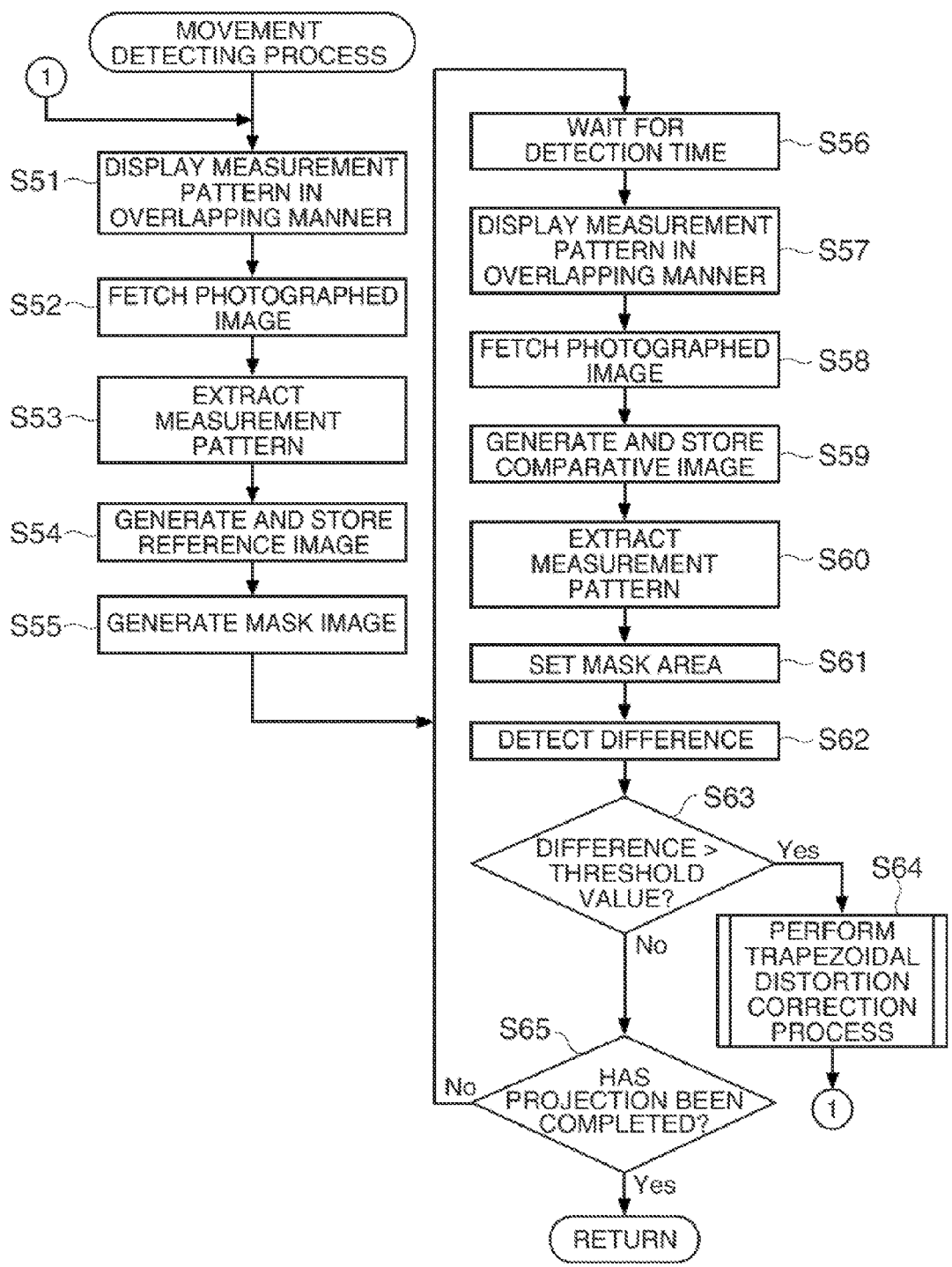
FIG. 6 is a flowchart illustrating a movement detecting process using a measurement pattern.

FIG. 6 is a flowchart illustrating the movement detecting process using a measurement pattern.

The CPU 120 reads out image data of the measurement pattern stored in the measurement pattern storing unit 172, outputs the image data to the video processor 134 together with a command, and projects the measurement pattern so as to overlap the image that is currently displayed, by using the function of the pattern projection control unit 129 (Step S51). Subsequently, the CPU 120 allows the imaging unit 180 to perform photographing in a state in which the measurement pattern is projected and acquires a photographed image from the captured image memory 182 (Step S52).

The CPU 120 extracts the measurement pattern from the acquired photographed image (Step S53) and stores the extracted image in the reference image storing unit 161 as the reference image (FIG. 1) (Step S54).

In addition, the CPU 120 generates a mask image that masks an outer area, disposed away from the area from which the measurement pattern is extracted by a predetermined distance, of the reference image stored in Step S54 by using the function of the image processing unit 127 and stores the mask image in the reference image storing unit 161 (Step S55). In Step S55, a portion of the reference image that does not affect the measurement pattern is masked. The area to be masked may be determined in accordance with the position of the measurement pattern extracted in Step S53 or may be located at a position set in advance. In addition, in a case where a plurality of measurement patterns is stored in the measurement pattern storing unit 172, an area to be masked may be set in correspondence with each measurement pattern and be stored in the ROM 170.

Here, the CPU 120 waits for the detection time set in advance (Step S56), projects the same measurement pattern as that of Step S51 onto the screen SC again after the detection time elapses (Step S57), allows the imaging unit 180 to perform photographing, and acquires a photographed image from the captured image memory 182 (Step S58). The CPU 120 performs a process of extracting the measurement pattern for the acquired photographed image, similarly to Step S53, by using the function of the image processing unit 127 (Step S59), and stores the extracted image in the comparative image storing unit 162 as a comparative image (Step S60). If the relative position of the projector 100 with respect to the screen SC has not changed, the comparative image generated here is the same image as the reference image generated in Step S54.

In addition, the CPU 120 sets a mask area in the comparative image stored in the comparative image storing unit 162 by using the function of the image processing unit 127 (Step S61). The mask area set here is located at the same position as that of the area masked in the mask image generated in Step S55.

Then, the CPU 120 detects a difference between the reference image (mask image) stored in the reference image storing unit 161 and the comparative image in which the mask area is set in Step S61 by using the function of the movement detecting unit 128 (Step S62). In Step S62, similarly to Step S43 (FIG. 5), for example, a sum of the absolute values of differences or a sum of squares of the differences is calculated.

Here, the CPU 120 determines whether or not the acquired difference exceeds a threshold value by using the function of the movement detecting unit 128 (Step S63). In a case where the difference exceeds the threshold value, it represents that the relative position of the projector 100 with respect to the screen SC changes, and accordingly, the CPU 120 performs trapezoidal distortion correction that is similar to the process shown in FIG. 3 (Step S64). After performing the trapezoidal distortion correction, the CPU 120 returns the process to Step S51 and generates a reference image again. In addition, since the reference image generated in Step S54 and the comparative image generated in Step S60 are the same images, after the trapezoidal distortion correction process of Step S64 is performed, that process of Steps S51 to S53 may be omitted and store the comparative image stored in the comparative image storing unit 162 may be stored in the reference image storing unit 161 as the reference image.

On the other hand, in a case where the difference acquired in Step S62 does not exceed the threshold value (No in Step S63), the CPU 120 determines whether or not projection is completed (Step S65), and, in a case where the projection is not completed, the process is returned to Step S56. In Step S56, the detection time is waited, and the process of Steps S57 to S63 is performed again. The mask image compared with the comparative image in this process is a mask image that is stored in the reference image storing unit 161. In other words, until the difference exceeds the threshold value in Step S63, the reference image generated in Step S54 is continuously used. Then, until the difference between the reference image and the comparative image generated in Step S60 exceeds the threshold value, the process of Steps S57 to S63 is repeatedly performed for every detection time.

Through the movement detecting process shown in FIG. 6, the projector 100 performs trapezoidal distortion correction process in accordance with the operation of the remote controller 191 or the operation unit 195 after starting projection. Then, in a case where the relative position of the projector 100 with respect to the screen SC changes, and there is a change in the photographed image that is photographed by the imaging unit 180 in accordance with the change in the relative position, the projector 100 performs the trapezoidal distortion correction process again. In this process, the CPU 120 generates the reference image and the comparative image by extracting the measurement pattern from the photographed image photographed by the imaging unit 180 in the state in which the measurement pattern is projected onto the screen SC and compares the reference image and the comparative image. Accordingly, a difference between the reference image and the comparative image can be accurately detected without using the frame of the screen SC or the like and without being affected by the projection image. Therefore, in a case where re-correction is necessary after the distortion of the projection image is corrected, the status of the projection image can be maintained well by correcting the projection image in a relatively speedy manner.

In addition, the reference image (mask image) that is based on a photographed image photographed immediately after the trapezoidal distortion correction process performed in Step S13 (FIG. 2) or Step S64 and the comparative image for which mask processing has been performed in Step S61 are compared with each other by using the function of the movement detecting unit 128. Thus, since the CPU 120 detects a change in the relative position after the last (latest) trapezoidal distortion correction process, it can be accurately determined whether or not correction of the distortion of the projection image is necessary in accordance with the change in the relative position of the projector 100 and the screen SC.

Figure 7A:
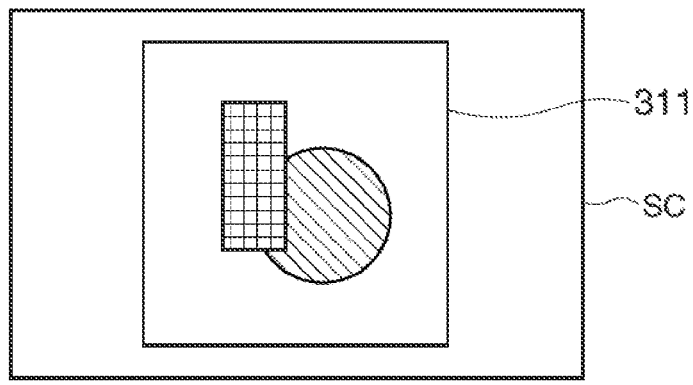
FIGS. 7A, 7B, and 7C are diagrams showing an example of a measurement pattern that is projected onto a screen.
Figure 7B:
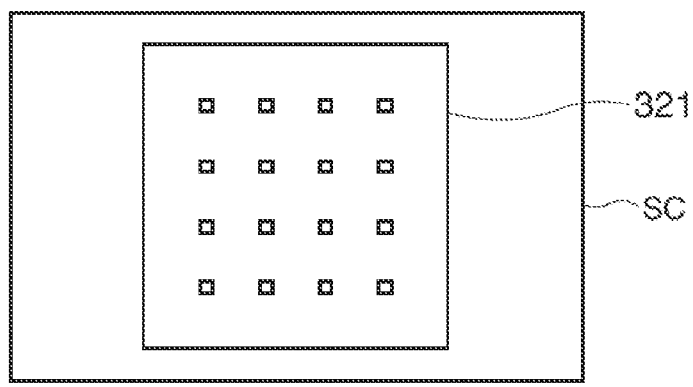
Figure 7C:
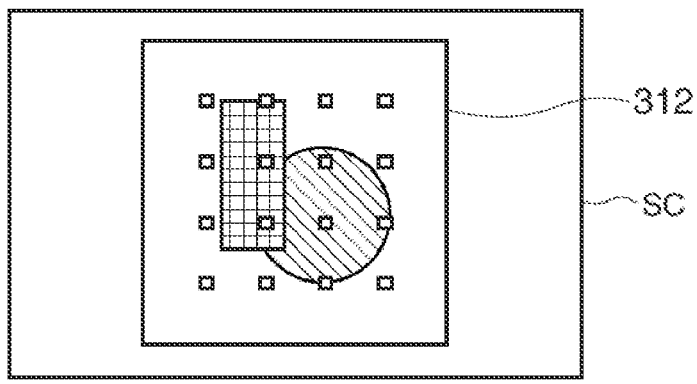

FIGS. 7A to 7C are diagrams showing an example of the measurement pattern that is projected onto a screen SC. FIG. 7A shows an example of the projection image, FIG. 7B shows an example of the measurement pattern, and FIG. 7C shows an example in which the measurement pattern is projected so as to overlap the image.

FIGS. 7A to 7C show examples of the measurement pattern that is displayed at a position overlapping the projection image. As shown in FIG. 7A, in a case where the projection image 311 having a rectangular shape is displayed (projected) at an approximate center of the screen SC, as shown in FIG. 7B, when the measurement pattern that is displayed in an approximately same size as that of the projection image 311 at the same position as that of the projection image 311 overlaps the projection image, the projection is performed as shown in FIG. 7C. The measurement pattern 321 is displayed in the same area as that of the projection image 311 in the displayable area of the liquid crystal panel 130. Like this measurement pattern 321, by using a measurement pattern that overlaps the area in which the projection image 311 is displayed (projected), even in a case where the displayable area of the liquid crystal panel 130 is narrow or the projectable size of the screen SC is small, the measurement pattern can be displayed in an enlarged scale in a wide area as much as possible, whereby the difference between the reference image and the comparative image can be accurately detected.

Although an overlapped image 312 shown in FIG. 7C is acquired by overlapping the projection image 311 and the measurement pattern 321 with each other in the same range, the measurement pattern 321 is overlapped on the upper side. Accordingly, in a case where the measurement pattern 321 is photographed by the imaging unit 180, the measurement pattern 321 can be easily extracted from the photographed image.

Figure 8A:
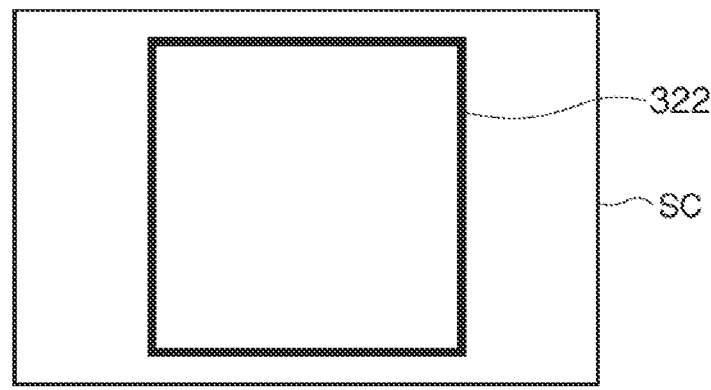
FIGS. 8A and 8B are diagrams showing another example of a measurement pattern that is projected onto the screen.
Figure 8B:
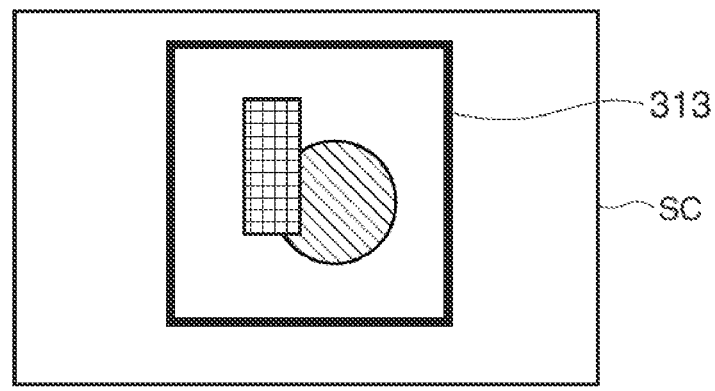

FIGS. 8A and 8B are diagrams showing another example of the measurement pattern that is projected onto the screen SC. FIG. 8A shows an example of a measurement pattern having a frame shape, and FIG. 8B shows an example in which the measurement pattern having the frame shape is projected so as to overlap the image.

The measurement pattern 322 shown in FIG. 8A is a shape that becomes the frame of an image projected onto the screen SC. In a case where the measurement pattern 322 overlaps the projection image, as shown in FIG. 8B, an overlapped image 313 is formed in which the frame is added to the projection image. This measurement pattern 322 can be projected so as to overlap the projection image while scarcely affecting the visibility of the projection image, and thus, in a case where the measurement pattern is used in the movement detecting process described with reference to FIG. 6, the movement detecting process can be performed without interrupting the projection of the image. As shown in FIG. 8B, in a case where the measurement pattern 322 having the frame shape overlaps the projection image, the CPU 120 may reduce the projection image by controlling the video processor 134. When the projection image is reduced by the amount corresponding to the thickness of the frame of the measurement pattern 322, the projection image is not hidden by the measurement pattern, and the influence of the projection image on the visibility can be nearly lost.

In addition, like the measurement pattern 322, a measurement pattern that is displayed outside the projection image may be displayed by using the non-displayable area of the liquid crystal panel 130. In other words, as shown in FIG. 4D, when trapezoidal distortion correction is performed, a non-use area 139 in which an image is not displayed is formed in the displayable area 131 of the liquid crystal panel 130. Accordingly, the same measurement pattern as the measurement pattern 322 may be displayed in the non-use area 139. In such a case, even in a case where the projection image is not reduced, the measurement pattern can overlap the projection image without affecting the visibility of the projection image.

Figure 9:
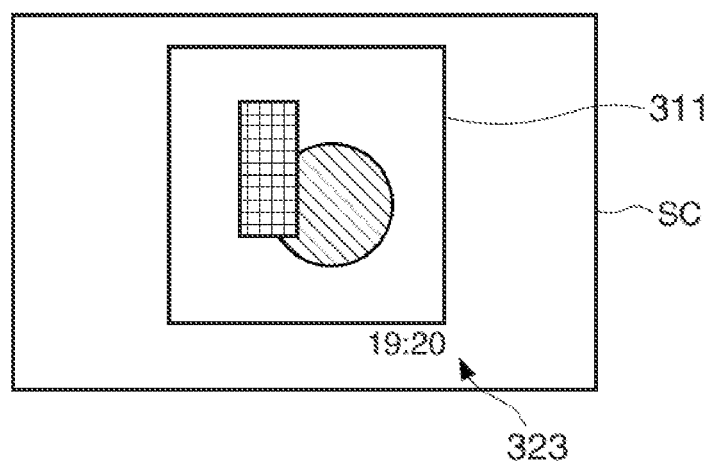
FIG. 9 is yet another example of the measurement pattern that is projected onto the screen and shows an example in which a measurement pattern having a time-display shape is projected so as to overlap the image.

FIG. 9 is a diagram showing yet another example of the measurement pattern that is projected onto the screen SC and shows the state in which the measurement pattern is projected together with the projection image.

As shown in FIG. 9, in a case where a measurement pattern 323 that is located outside the display position of the projection image 311 is used, the measurement pattern can overlap the projection image without affecting the visibility of the projection image. Since the measurement pattern 323 is displayed in a small portion of the outside of the projection image 311, the measurement pattern 323 can be displayed in the non-use area 139 that is formed in the displayable area 131 by the trapezoidal distortion correction. The non-use area 139 may be small depending on the projection angle of projection of the projector 100, as the measurement pattern that is shown in FIG. 9 as an example, a measurement pattern 323 that is displayed in only apart of the outside of the projection image 311 can be display without any problem.

Since the measurement pattern 323 shown in FIG. 9 displays the current time, even when the measurement pattern is projected onto the screen SC together with the projection image, it does not generate any sense of discomfort to a person viewing the projection image. In addition, in a case where a variable image such as this measurement pattern 323 is displayed, it may be configured such that a program for generating image data is stored in the ROM 170, the program is executed by the CPU 120, and image data of the measurement pattern is generated as needed and is output to the video processor 134.

As described above, the projector 100 according to the embodiment of the disclosure is the projector 100 that projects an image onto the screen SC and includes: a pattern projection control unit 129 that projects an image including a measurement pattern used for detecting movement; an imaging unit 180 that photographs the screen SC; an image processing unit 127 that generates a reference image based on a first photographed image that is photographed so as to be acquired by the imaging unit 180 during projection of the measurement pattern and generates a comparative image based on a second photographed image that is photographed so as to be acquired by the imaging unit 180 at a time point other than that of the photographing of the first photographed image; and a movement detecting unit 128 that detects a change in the relative position of the projector 100 with respect to the screen SC by using the reference image and the comparative image that are generated by the image processing unit 127. Ina case where the frame of the screen SC cannot be detected from the photographed image photographed by the imaging unit 180, a change in the relative position of the projector 100 with respect to the screen SC is detected by using the reference image and the comparative image. Here, the image including the measurement pattern includes an image acquired by overlapping the measurement pattern and the original projection image, an image acquired by overlapping the measurement pattern and another image, and an image that is formed only by the measurement pattern.

Accordingly, by comparing the reference image and the comparative image with each other, even in any one of the screen SC and the projector 100 is moved, the movement can be reliably detected regardless of the movement direction without being affected by the status of the screen SC and the like. Accordingly, the change in the position of the projector 100 that changes the projection angle can be reliably detected.

In addition, by detecting the difference between the reference image and the comparative image due to a change in the position of the measurement pattern, the movement detecting unit 128 can detect the change in the relative position of the projector 100 with respect to the screen SC can be reliably detected without being affected by the status of the screen SC or the like.

In addition, like the measurement pattern 322 shown in FIG. 8A, the measurement pattern of the frame shape surrounding the periphery of the projection image is projected by using the function of the pattern projection control unit 129, by projecting a large measurement pattern onto the screen SC, a large measurement pattern is included in the reference image and the comparative image. Accordingly, the difference between the reference image and the comparative image can be detected more reliably.

Furthermore, the image projected onto the screen SC may be reduced, and a measurement pattern having the frame shape as that of the measurement pattern 322 may be projected to the periphery of the reduced image by using the function of the pattern projection control unit 129. In such a case, the measurement pattern can be projected without any restriction of the projection image that is currently projected and without affecting the visibility of the projection image that is currently projected.

Then, the projector 100 performs trapezoidal distortion correction process in a case where a difference between the reference image and the comparative image is detected by using the movement detecting unit 128. In other words, it is accurately determined whether or not correction of the distortion of the projection image is necessary in accordance with a change in the relative position of the projector 100 and the screen SC, and, in a case where correction is necessary, trapezoidal distortion correction is performed. Accordingly, the image projected on the screen SC can be maintained in a state in which distortion is relatively small. In addition, in a case where the relative position of the projector 100 and the screen SC changes, and the trapezoidal distortion correction is necessarily to be performed again, an operation for instructing the trapezoidal distortion correction is not necessary, whereby the convenience can be improved.

In the above-described embodiment, photographing is performed by the imaging unit 180 with the measurement pattern being overlapped with the projection image, and the reference image and the comparative image are generated based on a photographed image. However, it may be configured such that the display of an image input from the A/D conversion unit 110 is stopped by the video processor 134, and only the measurement pattern is projected onto the screen SC. In such a case, since the process of generating the reference image and the comparative image based on the photographed image in which only the measurement pattern is included can be easily performed, the change in the relative position of the projector 100 can be detected at a higher speed with a low load.

In addition, the projector 100 includes a liquid crystal panel 130 that displays an image in a predetermined displayable area 131 and a projection optical system 150 that projects the image displayed on the liquid crystal panel 130 onto the screen SC, and, by using the function of the trapezoidal distortion correction unit 136, the image displayed in the displayable area 131 is changed, whereby distortion correction for correcting the deformation of the image projected onto the screen SC is performed. Then, similarly to the measurement pattern 322 shown in FIG. 8A or the measurement pattern 323 shown in FIG. 9, in a case where the measurement pattern is displayed in the non-use area 139 that is formed inside the displayable area 131 of the liquid crystal panel 130 by using the distortion correction function, the measurement pattern is projected so as not to overlap the projecting image. Accordingly, the measurement pattern can be projected without any restriction of the projection image and without affecting the visibility of the projection image that is currently projected.

Second Embodiment

Hereinafter, a second embodiment of the disclosure will be described with reference to the accompanying drawings.

A projector 100A according to this embodiment does not include the pattern projection control unit 129, which is different from the projector 100 according to the first embodiment.

In addition, the process performed by the projector 100A according to this embodiment is different from that performed by the projector 100 according to the first embodiment.

In the above-described first embodiment, the measurement pattern read out by the pattern projection control unit 129 is displayed so as to overlap the projection image, the imaging unit 180 performs photographing in the state in which the measurement pattern is projected onto the screen SC, and the CPU 120 performs the process of extracting a measurement pattern from the acquired photographed image.

On the other hand, according to this embodiment, instead of detecting the image of a measurement pattern included in the photographed image, the image of a featured object (the frame of the screen SC or the like) included in the photographed image is detected.

Hereinafter, detailed description of the configuration that is common to that of the first embodiment will be omitted, and differences from the first embodiment will be mainly described.

Figure 10:
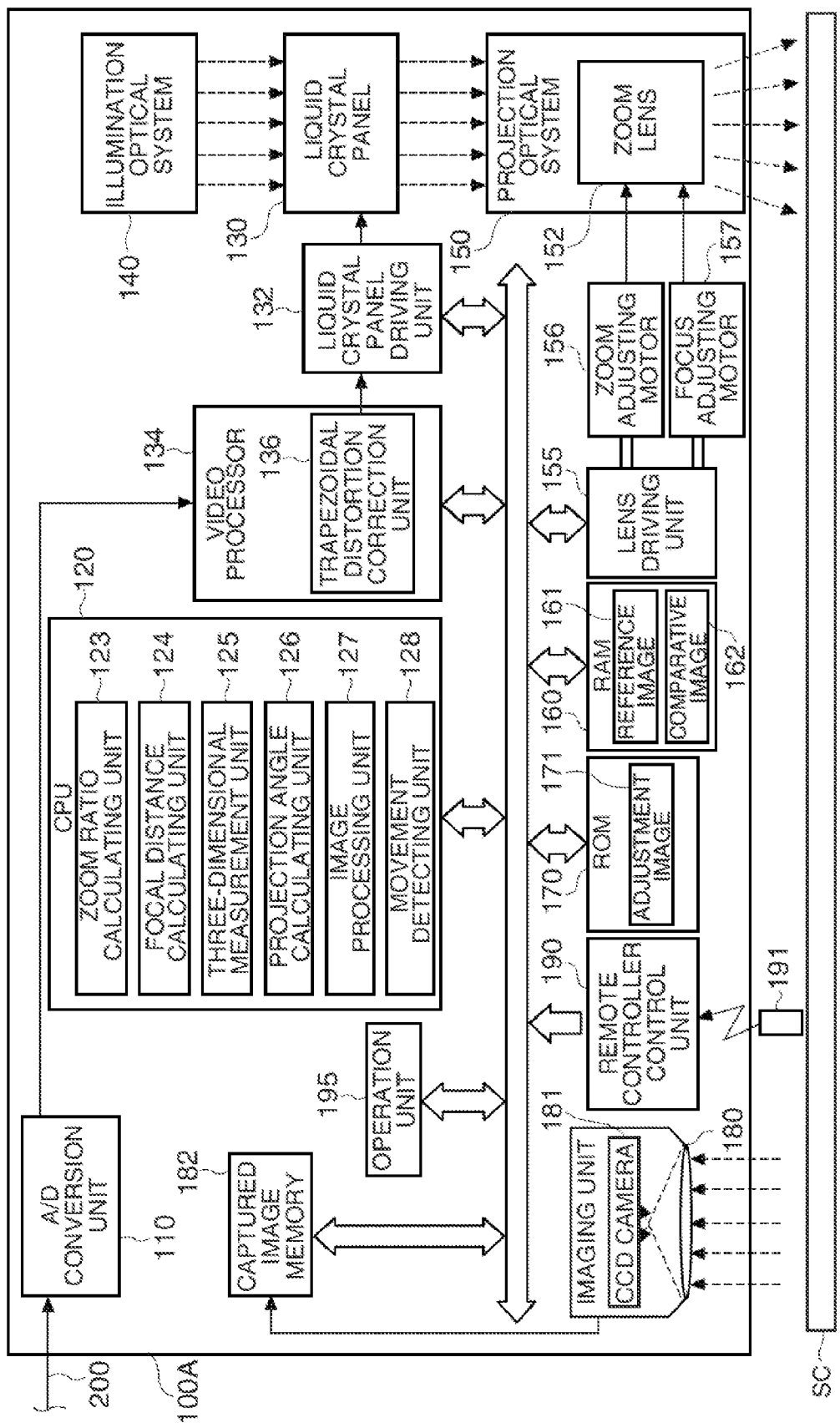
FIG. 10 is a block diagram showing the configuration of a projector according to a second embodiment of the disclosure.

FIG. 10 is a block diagram showing the configuration of the projector 100A according to the second embodiment of the disclosure. The basic configuration of the projector 100A is common to that of the projector 100 according to the first embodiment except that the pattern projection control unit 129 is not included, the ROM 171 does not include the measurement pattern storing unit 172, and the like.

An image processing unit 127 included in a CPU 120 of the projector 100A generates a reference image and a comparative image that are used for detecting a change in the relative position of a screen SC and the projector 100A.

Subsequently, the operation of the projector 100A will be described.

Figure 11:
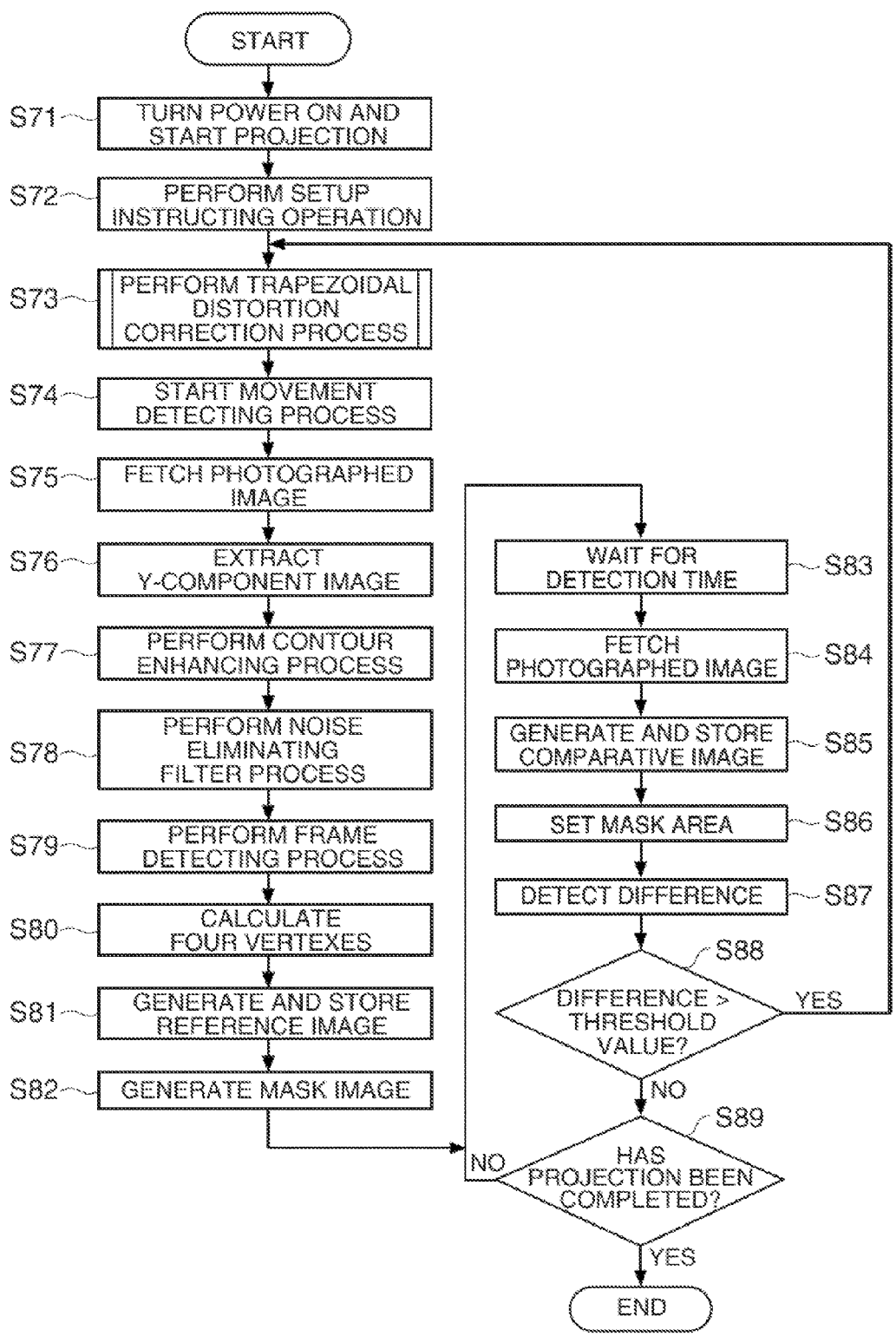
FIG. 11 is a flowchart illustrating the operation of the projector.
Figure 12:
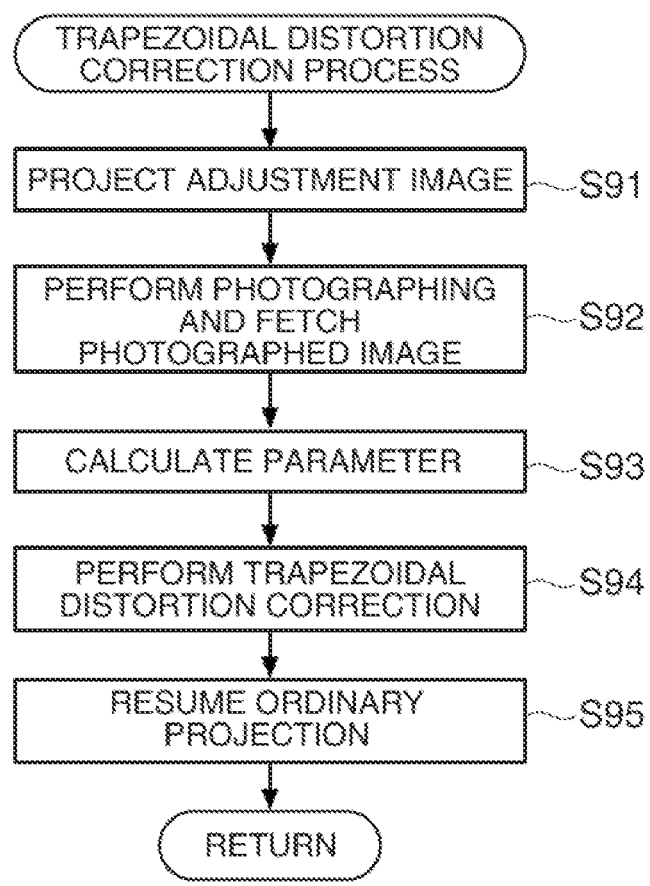
FIG. 12 is a flowchart illustrating the trapezoidal distortion correction process in detail.

FIGS. 11 and 12 are flowcharts illustrating the operation of the projector 100A. FIG. 11 illustrates the entire operation, and FIG. 12 illustrates a trapezoidal distortion correction process shown in Step S73 illustrated in FIG. 11.

When power is turned on, the projector 100A starts to project a projection image based on a video signal that is input from the outside (Step S71). When the projector 100A is instructed to execute a setup in accordance with an operator's operation for a remote controller 191 or an operation unit 195 (Step S72), the projector performs the trapezoidal distortion correction process (Step S73). Through this trapezoidal distortion correction process, the deformation of the projection image, which is projected onto the screen SC, that is caused by the projection angle of projection of the projector 100A is corrected, and the projection image is in the approximately original shape.

Here, the trapezoidal distortion correction process will be described.

FIG. 12 is a flowchart illustrating the process performed in the trapezoidal distortion correction process. The processes of Steps S91 to S95 in this trapezoidal distortion correction process are the same as those of Steps S21 to S25 in the first embodiment.

As shown in FIG. 12, the CPU 120 of the projector 100A projects an adjustment image onto the screen SC (Step S91) and allows an imaging unit 180 to photograph a projection image in a state in which the adjustment image is projected onto the screen SC (Step S92). This photographed image is stored in a captured image memory 182 under the control of the CPU 120.

Next, the CPU 120 acquires the photographed image photographed during projection of the adjustment image from the captured image memory 182 and calculates a parameter used for a trapezoidal distortion correction unit 136 to correct the trapezoidal distortion (Step S93).

In Step S93, the CPU 120, similarly to Step S23 according to the first embodiment, calculates a transformation coefficient (parameter) that is used for transforming the shape of an image before correction in a displayable area 131 of the liquid crystal panel 130 into the shape of an image after correction.

The CPU 120, similarly to Step S24, sets the acquired parameter in the trapezoidal distortion correction unit 136 and allows the trapezoidal distortion correction unit 136 to perform trapezoidal distortion correction (Step S94).

After the trapezoid distortion correction process is started, the CPU 120 allows a video processor 134 to resume projection of a video (Step S95) and ends the trapezoidal distortion correction process.

After the trapezoidal distortion correction process illustrated in FIG. 12 is performed, the CPU 120 starts a movement detecting process as illustrated in FIG. 11 (Step S74). The movement detecting process is a process of detecting a change in the relative position of the projector 100A with respect to the screen SC in a case where the relative position changes. In a case where the positional relation changes in accordance with the movement of the projector 10 OA or the screen SC, the projection angle of projection acquired in the trapezoidal distortion correction process of Step S73 changes, and accordingly, the parameter for the trapezoidal distortion correction changes. Therefore, the correction of distortion of the projection image projected onto the screen SC is insufficient. Thus, in order to maintain a state in which the distortion of the projection image is corrected, in a case where the relative position of the projector 100A with respect to the screen SC changes, the CPU 120 performs the trapezoidal distortion correction process of Step S73 again. Accordingly, the movement detecting process used for detecting a change in the relative position of the projector 100A with respect to the screen SC is started in Step S74.

After starting the movement detecting process, the CPU 120, first, acquires a photographed image (first photographed image) from a captured image memory 182 by allowing the imaging unit 180 to perform photographing (Step S75). Subsequently, the CPU 120 performs image processing such that the frame (featured object) of the screen SC is enhanced in the photographed image by using the function of the image processing unit 127. In other words, the CPU 120 acquires a gray scale image, which is acquired by extracting only the luminance component (Y), by extracting an image of the Y component from the acquired photographed image (Step S76). Subsequently, the CPU 120 performs a contour enhancing process (Step S77) and a process using a noise eliminating filter (Step S78) for the gray scale image extracted from the photographed image. Through such processes, a monochrome binary image or a gray scale image in which the contour of the photographed image is enhanced is acquired. In a case where the frame of the screen SC is included in the photographed image, through the above-described image processing, the frame of the screen SC is enhanced as a quadrangle frame border image.

Next, the CPU 120 detects an image of the frame of the screen SC from the image acquired by the process of Steps S76 to S78 (Step S79) and performs a process of acquiring the positions of four angles (vertex points) of the detected frame (Step S80).

In addition, the CPU 120 sets the image acquired by the process of Steps S76 to S78 as a reference image and stores the acquired image in the reference image storing unit 161 (FIG. 10) (Step S81).

Thereafter, the CPU 120 generates a mask image used for masking the inner side of the frame detected in Step S79 and an area disposed away from the frame by a predetermined distance in the reference image stored in Step S80, by using the function of the image processing unit 127 and stores the mask image in the reference image storing unit 161 (Step S82).

The mask image is an image acquired by masking a portion of the reference image, and the masked portion is not a target to be compared with the comparative image. Instead of comparing the reference image and the comparative image with each other, by comparing the mark image acquired by masking a portion of the reference image with the comparative image, there are advantages that the processing load at the time of detecting the movement is reduced, and the movement can be accurately detected.

Thereafter, the CPU 120, similarly to Step S39 according to the first embodiment, waits for a detection time that is set in advance (Step S83).

After the waiting for the detection time, the CPU 120 allows the imaging unit 180 to perform photographing and acquires a photographed image (second photographed image) from the captured image memory 182 (Step S84). The second photographed image is an image that is photographed at a time point different from the time point when the first photographed image is photographed. Subsequently, the CPU 120 generates a comparative image by allowing the image processing unit 127 to perform the same image processing as that performed in Steps S76 to S78 for the acquired second photographed image by using the function of the image processing unit 127 and stores the comparative image in the comparative image storing unit 162 (Step S85). Here, the generated comparative image is the same image as the reference image that is generated in Step S81.

The CPU 120 sets a mask area in the comparative image stored in the comparative image storing unit 162 by using the function of the image processing unit 127 (Step S86). Here, the mask area that is set here is located at the same position as that of the masked area of the mask image generated in Step S82.

Then, the CPU 120 detects a difference between the reference image (mask image) stored in the reference image storing unit 161 and the comparative image in which the mask area is set in Step S86 by using the function of the movement detecting unit 128 (Step S87). In Step S87, for example, a sum of the absolute values of differences or a sum of squares of the differences is calculated based on the pixel data of each pixel of a portion of the two images compared with each other that is acquired by excluding the masked area.

Here, the CPU 120 determines whether or not the acquired difference exceeds a threshold value by using the function of the movement detecting unit 128 (Step S88). In a case where the difference exceeds the threshold value, it represents that the relative position of the projector 100A with respect to the screen SC changes, and accordingly, the CPU 120 returns the process to Step S73 and performs trapezoidal distortion correction.

On the other hand, in a case where the difference acquired in Step S87 does not exceed the threshold value (No in Step S88), the CPU 120 determines whether or not projection is completed (Step S89), and, in a case where the projection is not completed, the process is returned to Step S83. In Step S83, the detection time is waited, and the process of Steps S84 to S88 is performed again. In other words, the photographed image is fetched, a comparative image is generated, and the comparative image and the reference image are compared with each other. At this time, the mask image compared with the comparative image is a mask image that is stored in the reference image storing unit 161. In other words, until the difference exceeds the threshold value in Step S88, the reference image generated in Step S81 is continuously used. Then, until the difference between the reference image and the comparative image generated in Step S85 exceeds the threshold value, the process of Steps S84 to S88 is repeatedly performed for every detection time.

Through the above-described process, the projector 100A performs trapezoidal distortion correction process in accordance with the operation of the remote controller 191 or the operation unit 195 after starting projection. Then, in a case where the relative position of the projector 100A with respect to the screen SC changes, and there is a change in the photographed image that is photographed by the imaging unit 180 in accordance with the change in the relative position, the projector 100A performs the trapezoidal distortion correction process again. Therefore, in a case where re-correction is necessary after the distortion of the projection image is corrected, the status of the projection image can be maintained well by correcting the projection image in a relatively speedy manner.

In addition, in a case where the process of Steps S87 to S88 is performed by using the function of the movement detecting unit 128, the reference image (mask image) that is based on a photographed image photographed immediately after the trapezoidal distortion correction process performed in Step S73 and the comparative image for which mask processing has been performed in Step S86 are compared with each other. Thus, since a change in the relative position after the last (latest) trapezoidal distortion correction process is detected, it can be accurately determined whether or not correction of the distortion of the projection image is necessary in accordance with the change in the relative position of the projector 100A and the screen SC.

Figure 13A:
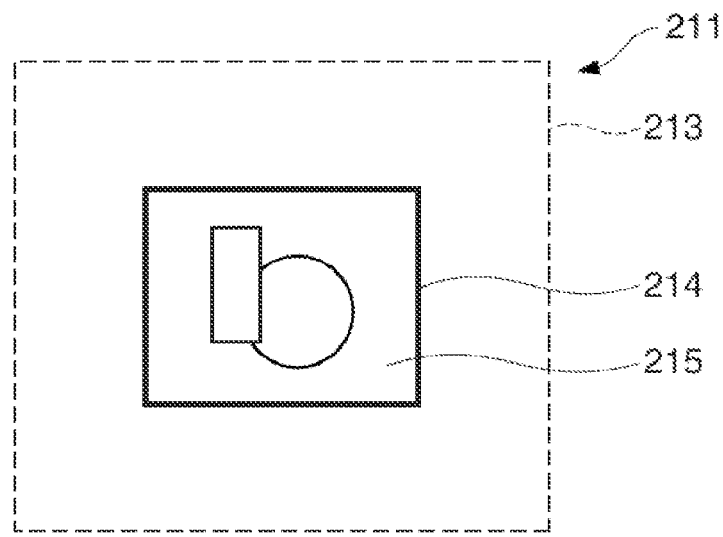
FIGS. 13A and 13B are diagrams showing specific examples of a reference image and a mask image that are generated by the projector.
Figure 13B:
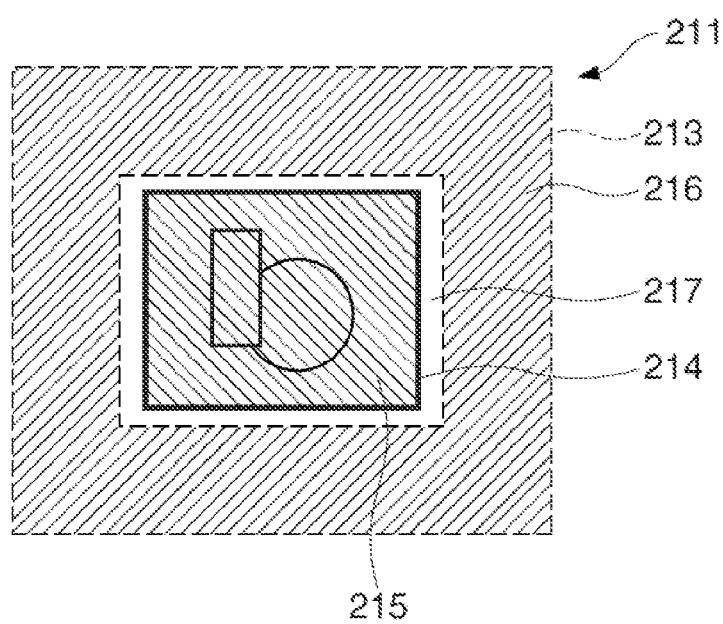

FIGS. 13A and 13B are diagrams showing specific examples of the mask image. FIG. 13A shows an example of the reference image, and FIG. 13B shows an example of the mask image.

A reference image 211 shown in FIG. 13A is an image acquired by setting a photographed image acquired by photographing a photographing target range 213 by using the imaging unit 180 as a gray scale image and performing a contour enhancing process and a process using a noise eliminating filter are performed for the image. In the reference image 211, a frame 214 of the screen SC and the contour of a projection image 215 that is projected in the range of the frame 214 are included.

A mask image 212 shown in FIG. 13B is an image acquired by masking a portion of the reference image 211, and a masked area is schematically shown by diagonal lines. In an actual mask image, the diagonal lines are not used, and, for example, the entire masked area is painted in white or black, and data representing the exclusion thereof from the comparison target and data used for designating the coordinates or the like of the masked area are associated with the mask image.

In the mask image 212, the inner side of the frame 214 is masked. The reason for this is that, although the projection image 215 is included on the inner side of the frame 214, the projection image 215 may greatly change in accordance with the elapse of time in many cases and is preferably not used for the comparison process. In addition, in the mask image 212, a band-shaped comparison area 217 is arranged so as to surround the frame 214 on the outer side of the frame 214, and the outer side of the comparison area 217 is masked. For example, while the projector 100A projects an image such as in a case where a presentation or the like is performed, persons approach near the frame 214 and move, and accordingly, there is frequently the shadow of a person near the frame 214. The shadow of a person that is included in the photographed image may greatly move in accordance with the elapse of time with a high probability and is preferably not used in a comparison process. Thus, as shown in FIG. 13B, it is effective to mask a portion that is disposed away from the frame 214 by a predetermined distance or longer as an outer mask area 216. However, as shown in FIG. 13B, all the upper, lower, right, and left sides of the frame 214 do not need to be set as the outer mask area 216, and, by arranging the outer mask area 216 on any one of left and right sides of the frame 214 and the lower side of the frame 214 on which the shadow of a person may be easily included, the influence of the shadow of a person can be reduced.

A predetermined distance from the image of the frame 214 to the outer mask area 216, that is, the size of the comparison area 217 arranged on the periphery of the image of the frame 214 is arbitrary. In a case where the comparison area 217 is small (small width), and the number of pixels included in the comparison area 217 is small, there is an advantage that the amount of calculation in the movement detecting process is suppressed. In addition, in a case where the comparison area 217 is small, when the relative position of the projector 100A with respect to the screen SC changes, the frame 214 of the screen SC may be located on the outer side of the comparison area 217. However, in a case where the frame 214 runs off the comparison area 217, the difference between the images increases in the comparison area 217 so as to exceed the threshold value. Accordingly, even in a case where the frame 214 runs off the comparison area 217, there is no concern that the movement of the projector 100A and the screen SC is detected. However, in a case where the number of pixels included in the comparison area 217 is extremely small, the value of the difference between the reference image and the comparison image may be easily an extreme value, and accordingly, in one embodiment the pixels corresponding to a number of some degrees are included in the comparison area 217.

In FIGS. 13A and 13B, although an example of the reference image is shown, the comparative image in which the mask area is set in Step S86 (FIG. 11) is in the similar state. In Step S87 illustrated in FIG. 12, since the difference is acquired by comparing the pixels located at the same position in the reference image and the comparative image, it is necessary that the areas to be masked are located at the same position and have the same size.

Accordingly, in a case where the difference is determined to exceed the threshold value in Step S88, and the process proceeds to Step S73, after the trapezoidal distortion correction process is performed in Step S73, the comparative image generated in Step S85 may be stored in the reference image storing unit 161 as the reference image instead of performing the process of Steps S75 to S78. Since the comparative image is an image acquired by performing the same image processing as that performed for the reference image for the photographed image acquired by the imaging unit 180, it can be used for some other purpose. In addition, a time until photographing is performed in Step S75 immediately after the imaging unit 180 performs photographing in Step S84 is short, and the probability that a change in the relative position of the projector 100A and the screen SC occurs is not high. Accordingly, there is scarcely a disadvantage of using the comparative image as the reference image, and there is a great advantage of omitting the process of Steps S75 to S78 including photographing.

As described above, the projector 100A according to the embodiment of the disclosure includes: the imaging unit 180 that photographs the screen SC; the image processing unit 127 that generates the reference image based on the first photographed image photographed by the imaging unit 180 and generates the comparative image based on the second photographed image that is photographed by the imaging unit 180 at a time point other than a time point at which the first photographed image is photographed; and the movement detecting unit 128 that detects a change in the relative position of the screen SC and the projector 100A by detecting a difference between images that is caused by a change in the position of the screen SC within the images by comparing the reference image and the comparative image generated by the image processing unit 127. Accordingly, in a case where one of the projector 100A and the screen SC is moved between the time of photographing a photographed image that becomes the origin used for generating the reference image and the time of photographing a photographed image that becomes the origin used for generating the comparative image, a difference between the reference image and the comparative image due to a change in the position of the screen SC between the reference image and the comparative image that is made in accordance with the change in the relative position thereof, whereby the change in the relative position can be reliably detected. Accordingly, a change in the relative position that changes the projection image of the screen SC can be reliably detected.

The projector 100A allows the imaging unit 180 to photograph a photographing range that includes the screen SC so as to acquire a photographed image, the image processing unit 127 generates the reference image and the comparative image by performing image processing, in which the frame of the screen SC is enhanced, for the acquired image photographed by the imaging unit 180, and the movement detecting unit 128 detects a difference between images by acquiring a difference between the reference image and the comparative image for each pixel. Accordingly, the change in the relative position of the screen SC and the projector 100A can be reliably detected in a relatively speedy manner.

In addition, the projector 100A masks portions of the reference image and the comparative image and acquires a difference thereof by comparing portions thereof that are not masked. By masking the inner side of the frame of the screen SC, the difference between images can be detected without being influenced by the image that is currently projected onto the screen SC. In addition, by masking an area that is disposed far away from the frame of the screen SC by a predetermined distance or longer, the difference between the images can be detected without being influenced by the shadow of a person moving on the periphery of the screen SC. Accordingly, the change in the relative position of the screen SC and the projector 100A can be reliably detected in a relatively speedy manner without being influenced by the change of the projection image or the movement of a person moving on the periphery of the screen SC.

Then, in a case where the difference between the reference image and the comparative image is detected by using the function of the movement detecting unit 128, the projector 100A performs trapezoidal distortion correction process. In other words, it is accurately determined whether correction of distortion of the projection image is necessary in accordance with the change in the relative position of the projector 100A and the screen SC, and, in a case where correction is necessary, trapezoidal distortion correction is performed. Accordingly, the image projected onto the screen SC can be maintained in a state in which distortion is small. In addition, in a case where the relative position of the projector 100A and the screen SC is changed, and it is necessary to perform the trapezoidal distortion correction again, an operation used for instructing the trapezoidal distortion correction is not necessary, whereby the convenience can be improved.

In addition, the above-described embodiments are merely examples of concrete forms to which the disclosure is applied and are not for the purpose of limiting the disclosure. Thus, the disclosure can be applied as another embodiment other than the above-described embodiments. For example, in the above-described first embodiment, a configuration is employed in which a change in the relative position of the projector 100 with respect to the screen SC is detected by acquiring a difference of pixel data between the reference image and the comparative image and comparing the sum of the absolute values of differences or the sum of squares of the differences with the threshold value. However, the disclosure is not limited thereto, and it may be configured such that the position (coordinates) of the measurement pattern in the comparative image is detected, and a change in the relative position is detected based on whether or not a difference between the position (coordinates) and the position (coordinates) of the measurement pattern detected from the reference image exceeds a threshold value. In addition, in the above-described first embodiment, although the reference image and the comparative image are images acquired by extracting the measurement pattern from the photographed image, the reference image and the comparative image may be images for which a contour enhancing process or a contour extracting process is additionally performed. Alternatively, the reality of each one of the reference image and the comparative image may be coordinate data that represents the positional coordinates of the contour line of the extracted measurement pattern. In addition, the color of the measurement pattern is arbitrary, and by using a measurement pattern configured by a color that is difficult to visually recognize through the eyes of a person, the influence thereof on the projection image may be suppressed.

In addition, in the above-described second embodiment, a configuration is employed in which a change in the relative position of the projector 100A with respect to the screen SC is detected by acquiring a difference of pixel data between the reference image and the comparative image and comparing the sum of the absolute values of differences or the sum of squares of the differences with the threshold value. However, the disclosure is not limited thereto, and it may be configured such that the position (coordinates) of the frame of the screen SC in the comparative image is detected, and a change in the relative position is detected based on whether a difference between this position (coordinates) and the position (coordinates) of the frame of the screen SC detected in the reference image exceeds a threshold value. In addition, in the above-described second embodiment, the image processing is configured such that the frame of the screen SC as the featured object can be easily detected. However, the disclosure is not limited thereto, and a facility such as a clock or a window that is installed on the periphery of the screen SC or an installed object may be the featured object.

In addition, in the above-described first and second embodiment, the imaging unit 180 has been described to have a configuration including the CCD camera 181 including a CCD image sensor, the disclosure is not limited thereto. Thus, a CMOS sensor may be used as the image sensor of the imaging unit 180.

In addition, in the above-described embodiment, although the display unit that modulates light emitted from the light source has been described to have a configuration using three transmissive-type or reflective-type liquid crystal panels 130 corresponding to colors RGB as an example, the disclosure is not limited thereto. Thus, for example, the display unit may be configured by a system in which one liquid crystal panel and a color wheel are combined, a system in which three digital mirror devices (DMDs) are used, a DMD system in which one digital mirror device and a color wheel are combined, or the like. Here, in a case where only one liquid crystal panel or only one DMD is used as the display unit, a member such as a cross-dichroic prism corresponding to the composition optical system is not necessary. In addition, any configuration other than the liquid crystal panel or the DMD in which light emitted by a light source can be modulated can be employed without any problem.

Furthermore, each functional unit shown in FIG. 1 or 10 represents the functional configuration of the projector 100 or the projector 100A, and a specific mounting form is not particularly limited. In other words, hardware respectively corresponding to each functional unit may not be necessarily mounted, and it is apparent that one processor can be configured to realize a plurality of functional units by executing programs. In addition, a part of the function that is realized by software in the above-described embodiment may be realized by hardware, or a part of the function that is realized by hardware in the above-described embodiment may be realized by software. Therefore, it is manifestly intended that embodiments in accordance with the present disclosure be limited only by the claims and the equivalents thereof.

What is claimed is:

1. A projector that projects an image onto a projection surface, the projector comprising:
   a projection unit that projects the image;

a projection control unit that controls the projection unit so as to project, a featured image used for movement detection;

an imaging unit that photographs the projection surface and acquires a first photographed image during the projection of the featured image at a first time point and acquires a second photographed image during the projection of the featured image at a second time point different from the first time point;

an image processing unit that generates a reference image based on the first photographed image and generates a comparative image based on the second photographed image; and a movement detecting unit that detects a change in a relative position of the projector with respect to the projection surface by using the reference image and the comparative image generated by the image processing unit.

2. The projector according to claim 1, wherein the movement detecting unit detects the change in the relative position of the projector by detecting a difference between the reference image and the comparative image due to a change in a position of the featured image.

3. The projector according to claim 1, wherein the projection control unit controls the projection unit so as to project the featured image having a frame shape that surrounds a periphery of the image projected onto the projection surface.

4. The projector according to claim 3, wherein the projection control unit controls the projection unit so as to reduce the image projected onto the projection surface and project the featured image having the frame shape on the periphery of the reduced image.

5. The projector according to claim 1, wherein the projection unit includes:
a display unit that displays the image in a predetermined displayable area; and
a projection optical system that projects the image displayed on the display unit onto the projection surface; and
the projection control unit includes:
a distortion correction unit that corrects deformation of the image projected onto the projection surface by transforming the image displayed in the displayable area of the display unit and displaying the featured image in a non-display area that is formed inside the displayable area of the display unit.

6. The projector according to claim 1, further comprising a trapezoidal distortion correction unit that performs a distortion correction by transforming the image projected by the projection unit when the change in the relative position of the projector is detected by the movement detecting unit.

7. A method of controlling a projector comprising:
projecting an image onto a projection surface, the image including a featured image used for movement detection;
photographing the projection surface and acquiring a first photographed image during the projection of the featured image at a first time point;
generating a reference image based on the first photographed image;
photographing the projection surface and acquiring a second photographed image during the projection of the featured image at a second time point different from the first time point;
generating a comparative image based on the second photographed image; and
detecting a change in a relative position of the projector with respect to the projection surface by using the reference image and the comparative image.

8. The method according to claim 7, further comprising:
performing a trapezoidal distortion correction by transforming the image projected by the projection unit when the change in the relative position of the projector is detected.

9. A projector that projects an image on a projection surface, the projector comprising:
a projection unit that projects the image;
an imaging unit that photographs the projection surface and acquires a first photographed image at a first time point and acquires a second photographed image at a second time point different from the first time point;
an image processing unit that generates a reference image based on the first photographed image and generates a comparative image based on the second photographed image; and
a movement detecting unit that detects a change in a relative position of the projector with respect to the projection surface by detecting a difference based on a change in the position of a featured object in a photographing range of the imaging unit by comparing the reference image and the comparative image that are generated by the image processing unit.

10. The projector according to claim 9, wherein the movement detecting unit detects the change in the relative position of the projector with respect to the projection surface based on a difference between pixels in the reference image and pixels in the comparative image.

11. The projector according to claim 10, wherein
the imaging unit acquires the photographed images by photographing the photographing range that includes a screen installed to the projection surface,
the image processing unit generates the reference image and the comparative image by performing a process of enhancing a frame of the screen for the photographed image, and
the movement detecting unit detects the change in the relative position of the projector by detecting a difference between the images caused by a change in a position of the frame.

12. The projector according to claim 11, wherein the movement detecting unit detects a difference between the reference image and the comparative image caused by the change in the position of the frame of the screen by comparing the images in a range in which an inner side of the frame of the screen is excluded.

13. The projector according to claim 11, wherein the movement detecting unit detects a difference between the reference image and the comparative image caused by the change in the position of the frame of the screen by comparing the images in a range in which a portion disposed away from the frame of the screen by a predetermined distance is excluded.

14. The projector according to claim 9, further comprising a trapezoidal distortion correction unit that performs a distortion correction by transforming the image projected by the projection unit when the change in the relative position of the projector is detected by the movement detecting unit.

15. A method of controlling a projector comprising:
projecting an image onto a projection surface;
photographing the projection surface and acquiring a first photographed image at a first time point;
generating a reference image based on the first photographed image;

photographing the projection surface and acquiring a second photographed image at a second time point different from the first time point;

generating a comparative image based on the second photographed image; and detecting a change in a relative position of the projector with respect to the projection surface by detecting a difference based on a change in the position of a featured object in a photographing range of the imaging unit by comparing the reference image and the comparative image.

16. The method according to claim 15, wherein the projector has a trapezoidal distortion correction function for performing a distortion correction by transforming the image projected by the projection unit when the change in the relative position of the projector is detected.

* * * * *